(12) United States Patent
Park et al.

(10) Patent No.: US 11,086,500 B2
(45) Date of Patent: Aug. 10, 2021

(54) FOLDABLE ELECTRONIC DEVICE AND METHOD FOR DISPLAYING INFORMATION IN FOLDABLE ELECTRONIC DEVICE

(71) Applicant: Samsung Electronics Co., Ltd., Gyeonggi-do (KR)

(72) Inventors: Hyunku Park, Gyeonggi-do (KR); Jaecheon Jeong, Gyeonggi-do (KR); Sukgi Hong, Gyeonggi-do (KR); Jungsik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/695,432

(22) Filed: Nov. 26, 2019

(65) Prior Publication Data

US 2020/0174646 A1    Jun. 4, 2020

(30) Foreign Application Priority Data

Nov. 29, 2018 (KR) .................. 10-2018-0151334

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 1/1652* (2013.01); *G06F 1/1677* (2013.01);
(Continued)

(58) Field of Classification Search
CPC ............. G06F 3/04845; G06F 3/0486; G06F 3/04883; G06F 3/04886; G06F 1/1652; G06F 1/1677; G06F 1/1683
See application file for complete search history.

(56) References Cited

U.S. PATENT DOCUMENTS 7,991,435 B2    8/2011    Bok et al.
2009/0247233 A1    10/2009    Kim
(Continued)

FOREIGN PATENT DOCUMENTS

JP    2011-091571 A    5/2011
JP    6116167 B2    4/2017
(Continued)

OTHER PUBLICATIONS

International Search Report dated Mar. 9, 2020.

*Primary Examiner* — Haoshian Shih
(74) *Attorney, Agent, or Firm* — Cha & Reiter, LLC.

(57) ABSTRACT

The disclosure relates to a foldable electronic device and a method for displaying information in the foldable electronic device. The foldable electronic device includes a foldable housing, a first display disposed on first and second inner surfaces of the foldable housing, where the first and second inner surfaces face each other in a folded state, a second display exposed through at least a portion of an outer surface of the foldable housing, a processor operatively connected to the first and second displays, and a memory operatively connected to the processor. The memory stores instructions that, when executed, cause the processor to display contents on the first display, receive a first user input for selecting at least a partial area of the displayed contents, generate an image based on information related to the selected partial area, and display the image on the second display. Other various embodiments are possible.

20 Claims, 25 Drawing Sheets

(51) Int. Cl.
*G06F 1/16* (2006.01)
*G06F 3/0488* (2013.01)
*G06F 3/0486* (2013.01)

(52) U.S. Cl.
CPC .......... *G06F 1/1683* (2013.01); *G06F 3/0486* (2013.01); *G06F 3/04883* (2013.01); *G06F 3/04886* (2013.01)

(56) References Cited

U.S. PATENT DOCUMENTS

| | | |
|---|---|---|
| 2011/0090246 A1 | 4/2011 | Matsunaga |
| 2012/0084694 A1 | 4/2012 | Sirpal et al. |
| 2014/0082538 A1 | 3/2014 | Hibi |
| 2015/0097755 A1* | 4/2015 | Kim ................... G06F 1/1641 |
| | | 345/1.3 |
| 2015/0324162 A1* | 11/2015 | Kim ................... G06F 1/1643 |
| | | 345/169 |
| 2015/0338888 A1 | 11/2015 | Kim et al. |
| 2016/0132074 A1 | 5/2016 | Kim et al. |
| 2016/0179236 A1 | 6/2016 | Shin et al. |
| 2016/0321969 A1 | 11/2016 | Kambhalta |
| 2017/0034446 A1 | 2/2017 | Park et al. |
| 2017/0075640 A1* | 3/2017 | Chun ................... G06F 3/04847 |
| 2018/0039410 A1* | 2/2018 | Kim ................... G06F 1/1641 |

FOREIGN PATENT DOCUMENTS

| | | |
|---|---|---|
| KR | 10-1179887 B1 | 9/2012 |
| KR | 10-1513023 B1 | 4/2015 |
| KR | 10-2016-0055646 A | 5/2016 |
| KR | 10-2016-0057225 A | 5/2016 |
| KR | 20160057225 A * | 5/2016 |
| KR | 10-2017-0015089 A | 2/2017 |
| KR | 10-2017-0090102 A | 8/2017 |

* cited by examiner

FOLDABLE ELECTRONIC DEVICE AND METHOD FOR DISPLAYING INFORMATION IN FOLDABLE ELECTRONIC DEVICE

CROSS-REFERENCE TO RELATED APPLICATION(S)

This application is based on and claims priority under 35 U.S.C. 119 to Korean Patent Application No. 10-2018-0151334, filed on Nov. 29, 2018, in the Korean Intellectual Property Office, the disclosure of which is herein incorporated by reference in its entirety.

BACKGROUND

1) Field

The instant disclosure generally relates to a foldable electronic device and a method for displaying information on the foldable electronic device.

2) Description of Related Art

In recent years, studies have been actively conducted on foldable electronic devices that have housings that may be folded or unfolded about hinge structures. These foldable electronic devices are expected to be next-generation electronic devices because they have the advantage of having enlarged display areas in the unfolded state while being compact while folded.

The above information is presented as background information only to assist with an understanding of the disclosure. No determination has been made, and no assertion is made, as to whether any of the above might be applicable as prior art with regard to the disclosure.

SUMMARY

A foldable electronic device may include a first housing structure and a second housing structure that are disposed to face each other in a folded state. The first housing structure includes a first surface that is connected to a hinge structure and faces a first direction, and a second surface that faces a second direction that is opposite to the first direction. The second housing structure includes a third surface that is connected to the hinge structure and faces the third direction, and a fourth surface that faces a fourth direction that is opposite to the third direction and contacts the first housing structure in an unfolded state. The display of the foldable electronic device may include a first display that extends from the first surface to the third surface and is defined by the first surface and the third surface, and a second display that is viewed through at least a portion of the second surface or the fourth surface.

According to an embodiment, an electronic device includes a foldable housing, a first display disposed on a first inner surface and a second inner surface of the foldable housing, where the first inner surface and the second inner surface face each other in a folded state, a second display exposed through at least a portion of an outer surface of the foldable housing, a processor operatively connected to the first display and the second display, and a memory operatively connected to the processor, where the memory stores instructions that, when executed, cause the processor to display contents on the first display, receive a first user input for selecting at least a partial area of the displayed contents, generate an image based on information related to the selected partial area, and display the image on the second display.

A method for displaying information by an electronic device, the electronic device includes a foldable housing, a first display disposed on a first inner surface and a second inner surface of the foldable housing, where the first inner surface and the second inner surface face each other in a folded state, and a second display exposed through at least a portion of an outer surface of the foldable housing, where the method includes displaying contents on the first display, receiving a first user input for selecting at least a partial area of the displayed contents, generating an image based on information related to the selected partial area, and displaying the image on the second display.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

In the above-described foldable electronic device, the user cannot view information displayed through the first display, i.e., the main display, in the folded state.

Certain embodiments of the disclosure may provide a foldable electronic device that may display at least part of the information displayed through the first display in the folded state by using a second display. A method for driving the foldable electronic device according to the above is also disclosed.

The electronic device and the method according to certain embodiments of the disclosure can provide additional convenience to the user by displaying at least part of the information displayed through the first display in the folded state through the second display.

Figure 1:
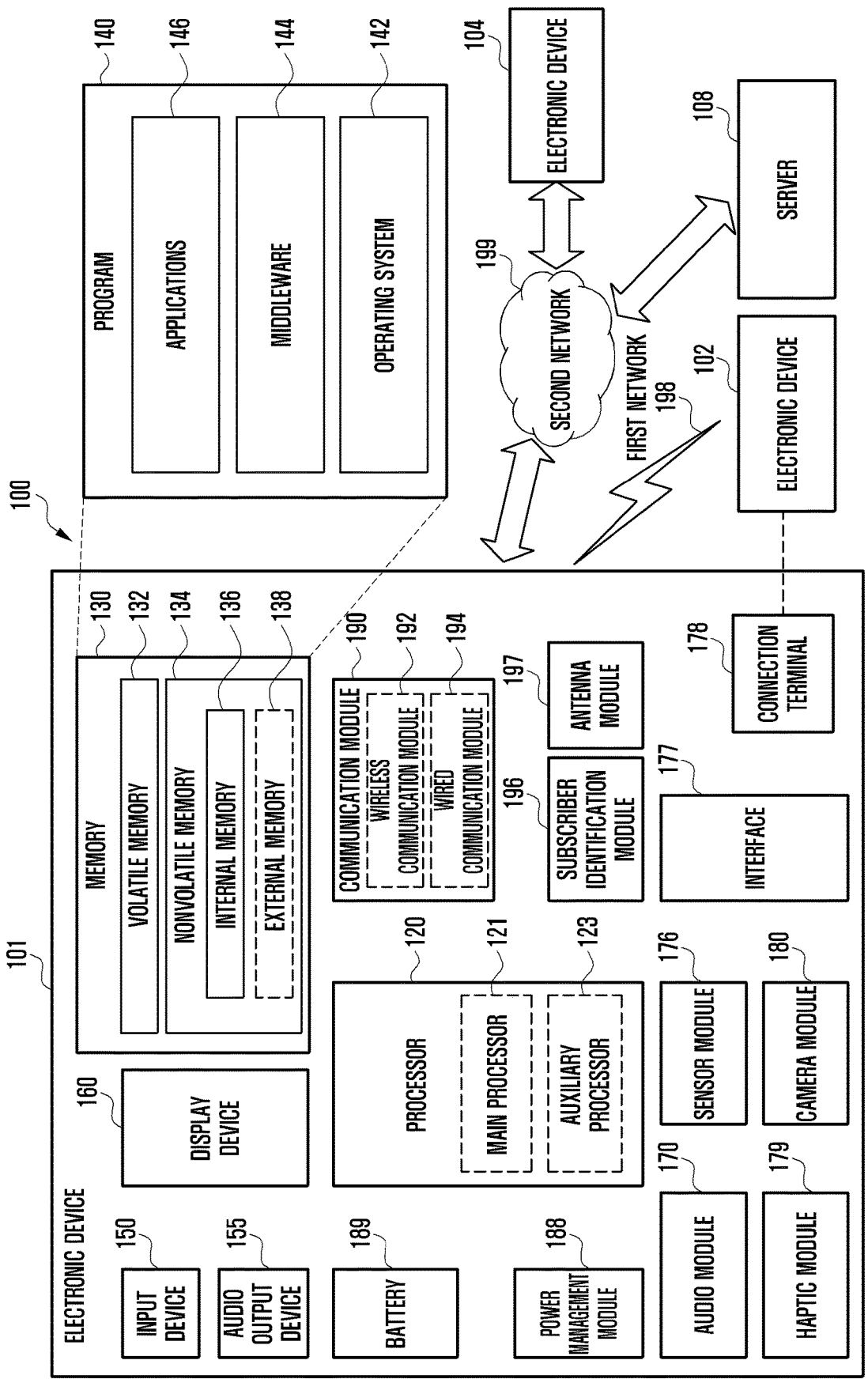
FIG. 1 illustrates a block diagram of an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
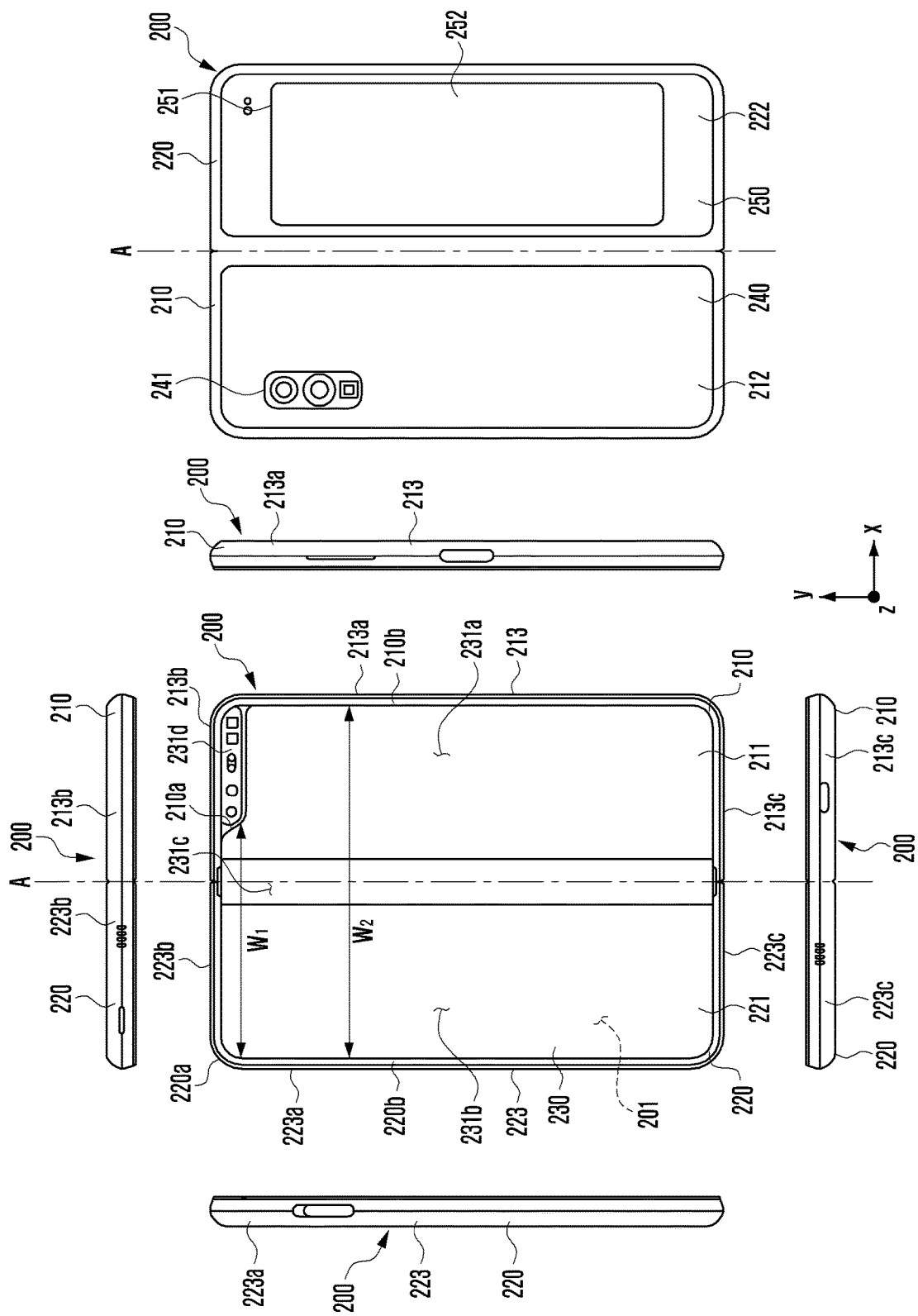
FIG. 2A is a view illustrating an unfolded state of an electronic device according to an embodiment of the disclosure.
Figure 2B:
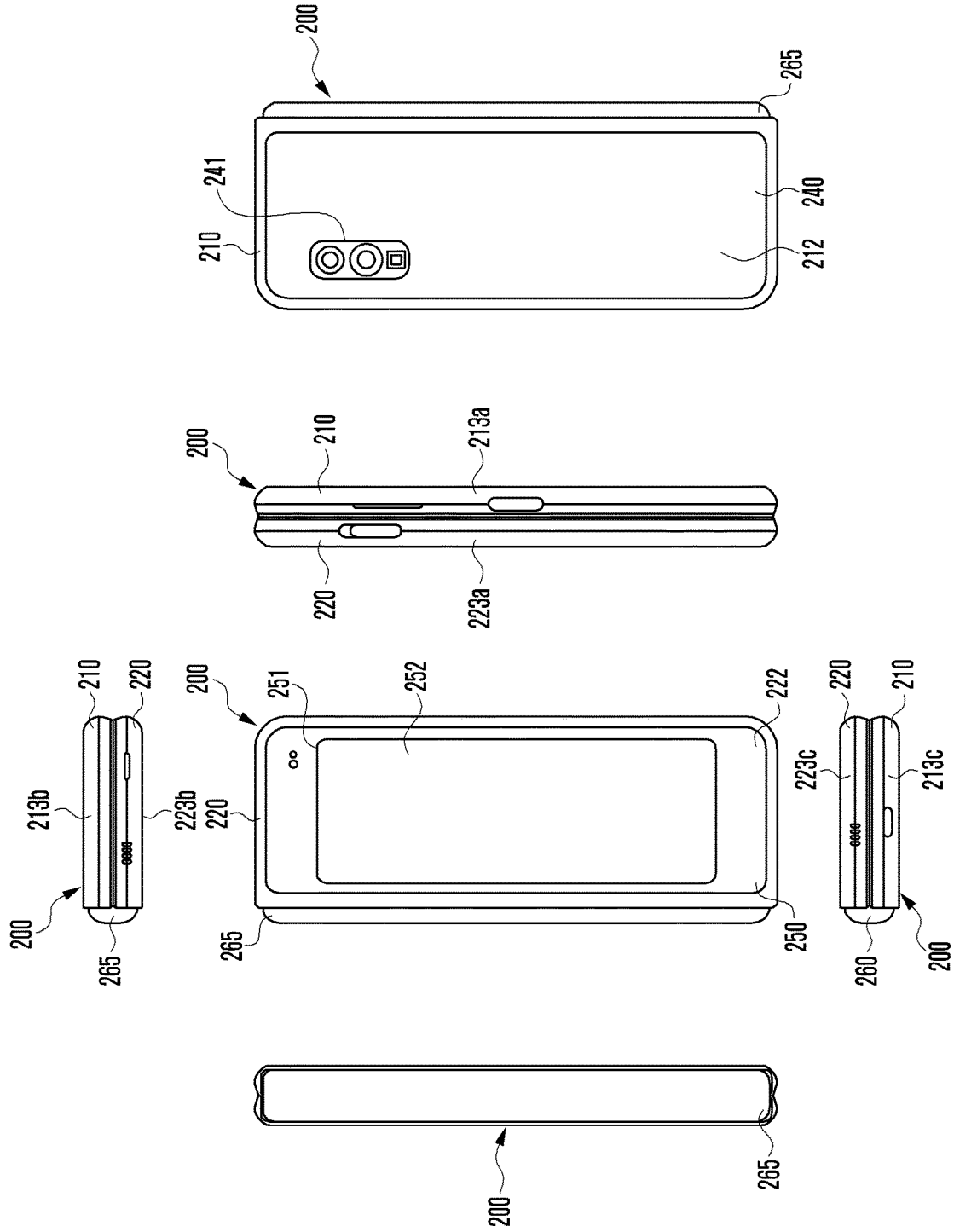
FIG. 2B is a view illustrating a folded state of the electronic device of FIG. 2A according to an embodiment of the disclosure.

FIG. 2A is a view illustrating an unfolded state of an electronic device 200 according to an embodiment of the disclosure. FIG. 2B is a view illustrating a folded state of the electronic device 200 of FIG. 2A according to an embodiment of the disclosure.

The electronic device 200 of FIGS. 2A and 2B may be partly similar to the electronic device 101 of FIG. 1 or may include other embodiments of the electronic device.

Referring to FIG. 2A, the electronic device 200 may include a pair of housing structures 210 and 220 pivotally coupled to each other through a hinge structure (e.g., the hinge structure 264 of FIG. 3) so that they can be folded with respect to each other. The electronic device 200 may further include a hinge cover 265 that covers the foldable portions of the pair of housing structures 210 and 220, and a display 230 (e.g., a flexible display or a foldable display) disposed in a space defined by the pair of housing structures 210 and 220. In the instant disclosure, a surface on which the display 230 is disposed may be defined as a front surface of the electronic device 200, and an opposite surface of the front surface may be defined as a rear surface of the electronic device 200. A surface that surrounds the space between the front surface and the rear surface may be defined as a side surface of the electronic device 200.

In an embodiment, the first housing structure 210 may include a sensor area 231d and a first rear cover 240. The second housing structure 220 may include a second rear cover 250. The pair of housing structures 210 and 220 of the electronic device 200 are not limited to the shape and coupling state illustrated in FIGS. 2A and 2B, and may be realized through another shape, another combination, or another coupling of components. For example, in another embodiment, the first housing structure 210 and the first rear cover 240 may be integrally formed, and the second housing structure 220 and the second rear cover 250 may be integrally formed.

According to an embodiment, the first housing structure 210 and the second housing structure 220 may be disposed on opposite sides of a folding axis (axis A), and may have shapes that are symmetrical to each other with respect to the folding axis (axis A). According to an embodiment, the angle or the distance between the first housing structure 210 and the second housing structure 220 may vary according to whether the electronic device 200 is unfolded (flat or open), folded (closed), or in an intermediate state between completely folded and unfolded. According to an embodiment, unlike the second housing structure 220, the first housing structure 210 may additionally include a sensor area 231d, in which various sensors are disposed, but outside of the sensor area 231d, the first housing structure 210 may be symmetrical to the second housing structure 220. In another embodiment, a sensor arrangement area 231d may be additionally disposed in at least a partial area of the second housing structure 220 or may be replaced.

In an embodiment, the first housing structure 210 may include a first surface 211 connected to the hinge structure (e.g., the hinge structure 264 of FIG. 3) while the electronic device 200 is unfolded and facing the front of the electronic device 200, a second surface 212 that faces an opposite direction of the first surface 211, and a first side surface 213 that surrounds at least a portion of the space between the first surface 211 and the second surface 212. In an embodiment, the first side surface 213 may include a first side surface 213a disposed parallel to the folding axis (axis A), a second side surface 213b that extends from one end of the first side surface 213a in a direction perpendicular to the folding axis (axis A), and a third side surface 213c that extends from an opposite end of the first side surface 213a in a direction perpendicular to the folding axis (axis A).

In an embodiment, the second housing structure 220 may include a third surface 221 connected to the hinge structure (e.g., the hinge structure 264 of FIG. 3) while the electronic device 200 in unfolded and facing the front of the electronic device 200, a fourth surface 222 that faces an opposite direction of the third surface 221, and a second side member 223 that surrounds at least a portion of the space between the third surface 221 and the fourth surface 222. In an embodiment, the second side member 223 may include a fourth side surface 223a disposed parallel to the folding axis (axis A), a fifth side surface 223b that extends from one end of the fourth side surface 223a in a direction perpendicular to the folding axis (axis A), and a sixth side surface 223c that extends from an opposite end of the fourth side surface 223a in a direction perpendicular to the folding axis (axis A). In an embodiment, the third surface 221 may face the first surface 211 in the folded state.

In an embodiment, the electronic device 200 may include a recess 201 in the first housing structure 210 and the second housing structure 220 that is configured to accommodate the display 230. The recess 201 may have a size that is substantially the same as that of the display 230. In an embodiment, due to the sensor area 231d, the recess 201 may have two different widths in a direction perpendicular to the folding axis (axis A). For example, the recess 201 may have a first width W1 between a first part 220a of the second housing structure 220, which is parallel to the folding axis (axis A), and a first part 210a of the first housing structure 210, which is formed at a periphery of the sensor area 231d. The recess 201 may have a second width W2 defined by a second part 220b of the second structure 220 and a second part 210b of the first housing structure 210, which does not correspond to the sensor area 213d and is parallel to the folding axis (axis A). In this case, the second width W2 may be longer than the first width W1. For example, the recess 201 may be disposed to have a first width W1 extending between the first part 210a of the first housing structure 210 and the first part 220a of the second housing structure 220, which are asymmetrical to each other, and a second width W2 extending between the second part 210b of the first housing structure 210 and the second part 220b of the second housing structure 220, which are symmetrical to each other. As such, the first part 210a and the second part 210b of the first housing structure 210 may have different distances from the folding axis (axis A). The width of the recess 201 is not limited to the illustrated example. In various other embodiments, by the shape of the sensor area 213d or asymmetrical parts of the first housing structure 210 and the second housing structure 220, the recess 201 may have two or more different widths.

In an embodiment, at least a portion of the first housing structure 210 and the second housing structure 220 may be made of metallic or nonmetallic materials having selected strengths to support the display 230.

In an embodiment, the sensor area 231d may be disposed at a location that is adjacent to one corner of the first housing structure 210. However, the arrangement, shape, or size of the sensor area 231d is not limited thereto. For example, in another embodiment, the sensor area 231d may be provided to another corner of the first housing structure 210 or an arbitrary area between the upper end corner and the lower end corner of the first housing structure 210. In another embodiment, the sensor area 231d may be disposed in a partial area of the second housing structure. In another embodiment, parts of the sensor area 231d may be disposed in both the first housing structure 210 and the second housing structure 220. In an embodiment, the electronic device 200 may have components for performing various functions that are exposed on the front surface of the electronic device 200 through the sensor area 213d or through one or more openings provided in the sensor area 231d. In various different embodiments, the components, for example, may be front camera devices, receivers, proximity sensors, illumination sensors, iris recognition sensors, ultrasonic wave sensors, indicators, etc.

In an embodiment, the first rear cover 240 may be disposed on the second surface 212 of the first housing structure 210, and may have a substantially rectangular shape. In an embodiment, at least a portion of the periphery of the first rear cover 240 may be surrounded by the first housing structure 210. Similarly, the second rear cover 250 may be disposed on the fourth surface 222 of the second housing structure 220, and at least a portion of the periphery of the second rear cover 250 may be surrounded by the second housing structure 220.

In the illustrated embodiment, the first rear cover 240 and the second rear cover 250 may have shapes that are substantially symmetrical to each other with respect to the folding axis (axis A). In another embodiment, the first rear cover 240 and the second rear cover 250 may include various different shapes. In another embodiment, the first rear cover 240 may be integrally formed with the first housing structure 210, and the second rear cover 250 may be integrally formed with the second housing structure 220.

In an embodiment, the first housing structure 210 and the second housing structure 220 may provide spaces in which various components (e.g., printed circuit board, antenna module, sensor module, or battery) of the electronic device 200 may be disposed. In an embodiment, one or more components may be disposed on the rear surface of the electronic device 200 so that they are exposed to the exterior of the electronic device 200. For example, one or more components or sensors may be exposed through the first rear cover 240 or the first rear area 241. In an embodiment, the sensors may include a proximity sensor, a rear camera, and/or a flash. In another embodiment, at least a portion of the sub-display 252 may be exposed through the second rear area 251 of the second rear cover 250.

The display 230 may be disposed in a space defined by the foldable housings 210 and 220. For example, the display 230 may be seated in a recess (e.g., the recess 201 of FIG. 2A) defined by the housing structures 210 and 220, and may be disposed to occupy substantially most of the front surface of the electronic device 200. Accordingly, the front surface of the electronic device 200 may include the display 230, a partial area (e.g., a peripheral area) of the first housing structure 210, and a partial area (e.g., a peripheral area) of the second housing structure 220, both of which are adjacent to the display 230. In an embodiment, the rear surface of the electronic device 200 may include the first rear cover 240, a partial area (e.g., a peripheral area) of the first housing structure 210, which is adjacent to the first rear cover 240, and a partial area (e.g., a peripheral area) of the second housing structure 220, which is adjacent to the second rear cover 250.

In an embodiment, the display 230 may be a display that has at least a partial area which may be deformed to be flat or curved. In an embodiment, the display 230 may include a folding area 231c, a first area 231a disposed on one side (e.g., the right side) of the folding area 231c, and a second area 231b disposed on an opposite side (the left side) of the folding area 231c. For example, the first area 231a may be disposed on the first surface 211 of the first housing structure 210, and the second area 231b may be disposed on the third surface 221 of the second housing structure 220. In an embodiment, the classification of the areas of the display 230 is illustrative, and in another embodiment, the display 230 may have a different number of folding areas and flat areas. As an example, although in the example shown in FIG. 2A, the folding area 231c and the folding axis (axis A) extend in parallel to the y axis, in another embodiment, the folding area and the folding axis may be parallel to another axis (e.g. the x axis). The entire screen of the display 230 may encompass the pair of housing structures 210 and 220 and the hinge structure. In an embodiment, the first area 231a and the second area 231b may have shapes that are generally symmetrical to each other with respect to the folding area 231c. However, the first area 231a, unlike the second area 231b, may include a notch area (e.g., the notch area 233 of FIG. 3) that is cut according to presence of the sensor area 231d, while the first area 231a is symmetrical to the second area 231b in other areas. As such, the first area 231a and the second area 231b may include portions that are symmetrical to each other, while also having portions that are asymmetrical.

Figure 3:
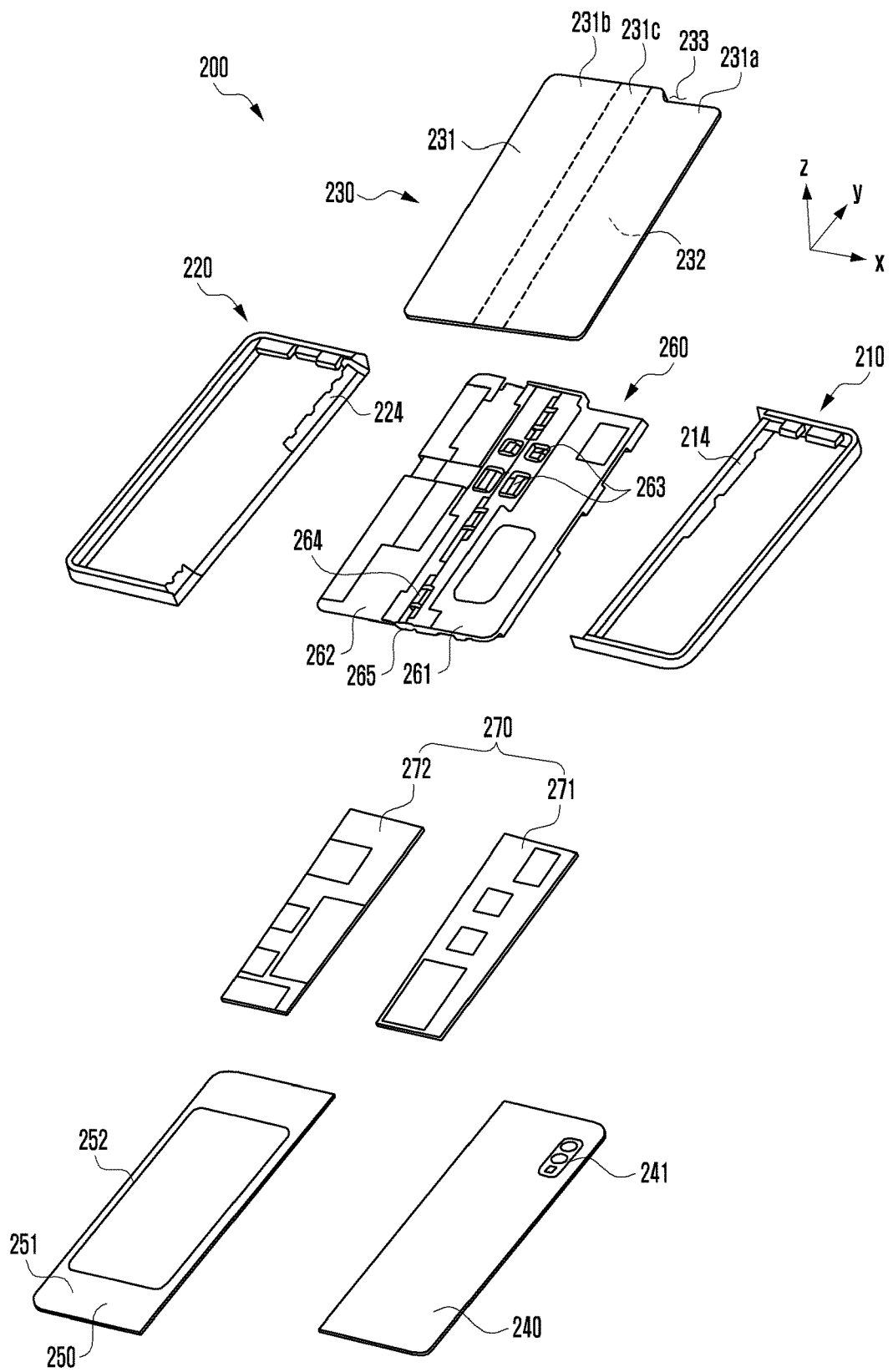
FIG. 3 is an exploded perspective view illustrating an electronic device according to an embodiment of the disclosure.

Referring to FIG. 2B, the hinge cover 265 is disposed between the first housing structure 210 and the second housing structure 220, and may be configured to cover an internal component (e.g., the hinge structure 264 of FIG. 3). In an embodiment, the hinge cover 265 may be covered by a portion of the first housing structure 210 and the second housing structure 220 while the device is unfolded. Alternatively, the hinge cover 265 may be exposed to the exterior of the device when the device is folded.

As an example, as illustrated in FIG. 2A, when the electronic device 200 is in the unfolded state, the hinge cover 265 may not be exposed as it is covered by the first housing structure 210 and the second housing structure 220. As illustrated in FIG. 2B, when the electronic device 200 is in the folded state (e.g., completely folded), the hinge cover 265 may be exposed between the first housing structure 210 and the second housing structure 220. As another example, when the electronic device 200 is in an intermediate state in which when the first housing structure 210 and the second housing structure 220 define a predetermined angle, the hinge cover 265 may be partly exposed to the outside of the electronic device 200 between the first housing structure 210 and the second housing structure 220. In this case, the exposed area when the electronic device 200 is in the intermediate state may be smaller than when the electronic device 200 is completely folded. In an embodiment, the hinge cover 265 may include a curved surface.

Hereinafter, the operations of the first housing structure 210 and the second housing structure 220 and the display 230 according to the operational states (e.g., the unfolded or flat state and the folded state) of the electronic device 200 will be described.

In an embodiment, when the electronic device 200 is in the unfolded state (flat state) (e.g., the state of FIG. 2A), the first housing structure 210 and the second housing structure 220 define an angle of 180 degrees, and the first area 231a and the second area 231b of the display may be disposed to face the same direction. The folding area 231c may define the same plane as the first area 231a and the second area 231b.

In an embodiment, when the electronic device 200 is in the folded state (e.g., the state of FIG. 2B), the first housing structure 210 and the second housing structure 220 may be disposed to face each other. The first area 231a and the second area 231b of the display 230 may face each other while defining a small angle (e.g., 0 degrees to 10 degrees). At least a portion of the folding area 231c may be a curved surface having a predetermined curvature.

In an embodiment, when the electronic device 200 is in the intermediate state, the first housing structure 210 and the second housing structure 220 may be disposed at a predetermined angle. The first area 231a and the second area 231b of the display 230 may define an angle that is larger than when in the folded state and smaller than when in the unfolded state. At least a portion of the folding area 231c may be a curved surface having a predetermined curvature, and the curvature then may be smaller than when in the folded state.

FIG. 3 is an exploded perspective view of an electronic device 200 according to an embodiment of the disclosure.

Referring to FIG. 3, in an embodiment, the electronic device 200 may include a display 230, a bracket assembly 260, at least one printed circuit board 270, a first housing structure 210, a second housing structure 220, a first rear cover 240, and a second rear cover 250. In the disclosure, the display 230 may be called a display module or a display assembly.

The display 230 may include a display panel 231 (e.g., a flexible display panel), and one or more plates 232 or layers, on which the display panel 231 is seated. In an embodiment, the plate 232 may be disposed between the display panel 231 and the bracket assembly 260. The display panel 231 may be disposed in at least a portion of one surface (e.g., a surface in the +z-direction of FIG. 3) of the plate 232. The plate 232 may have a shape corresponding to the display panel 231. For example, a partial area of the plate 232 may have a shape corresponding to the notch area 233 of the display panel 231.

The bracket assembly 260 may include a first bracket 261, a second bracket 262, a hinge structure 264 disposed between the first bracket 261 and the second bracket 262, a hinge cover 265 that covers the hinge structure 264 from the outside, and a wiring member 263 (e.g., a flexible printed circuit board (FPCB)) that crosses the first bracket 261 and the second bracket 262).

In an embodiment, the bracket assembly 260 may be disposed between the plate 232 and the at least one printed circuit board 270. As an example, the first bracket 261 may be disposed between the first area 231a of the display 230 and the first printed circuit board 271. The second bracket 262 may be disposed between the second area 231b of the display 230 and the second printed circuit board 272.

In an embodiment, at least a portion of the wiring member 263 and the hinge structure 264 may be disposed in the interior of the bracket assembly 260. The wiring member 263 may be disposed in a direction (e.g., the x axis direction) that crosses the first bracket 261 and the second bracket 262. The wiring member 263 may be disposed in a direction (e.g., the x axis direction) that is perpendicular to the folding axis (e.g., the y axis or the folding axis A of FIG. 1) of the folding area 231c.

The at least one printed circuit board 270, as mentioned above, may include a first printed circuit board 271 disposed on the first bracket 261, and a second printed circuit board 272 disposed on the second bracket 262. The first printed circuit board 271 and the second printed circuit board 272 may be disposed in the interior of the space defined by the bracket assembly 260, the first housing structure 210, the second housing structure 220, the first rear cover 240, and the second rear cover 250. Components for implementing various functions of the electronic device 200 may be mounted on the first printed circuit board 271 and the second printed circuit board 272.

In an embodiment, the first housing structure 210 and the second housing structure 220 may be assembled to be coupled to opposite sides of the bracket assembly 260 while the display 230 is coupled to the bracket assembly 260. As will be described later, the first housing structure 210 and the second housing structure 220 may be slid on the opposite sides of the bracket assembly 260 and be coupled to the bracket assembly 260.

In an embodiment, the first housing structure 210 may include a first rotation support surface 214, and the second housing structure 520 may include a second rotation support surface 224 corresponding to the first rotation support surface 214. The first rotation support surface 214 and the second rotation support surface 224 may include curved surfaces corresponding to the curved surface of the hinge cover 265.

In an embodiment, when the electronic device 200 is in the unfolded state (e.g., the state of FIG. 2A), the first rotation support surface 214 and the second rotation support surface 224 may cover the hinge cover 265 such that the hinge cover 265 is not exposed or is exposed minimally. In an embodiment, when the electronic device 200 is in the folded state (e.g., the state of FIG. 2B), the first rotation support surface 214 and the second rotation support surface 224 may rotate along the curved surface of the hinge cover 265 such that the hinge cover 265 is exposed maximally.

An electronic device (e.g., the electronic device 400 of FIG. 4) according to an embodiment of the disclosure may include a foldable housing, a first display (e.g., the main display 411 of FIG. 4) disposed on a first inner surface and a second inner surface of the foldable housing, where the first inner surface and the second inner surface face each other in a folded state, a second display (e.g., the sub-display 412 of FIG. 4) exposed through at least a portion of an outer surface of the foldable housing, a processor operatively connected to the first display and the second display, and a memory operatively connected to the processor, where the memory stores instructions that, when executed, cause the processor to display contents on the first display 411, receive a first user input for selecting at least a partial area of the displayed contents, generate an image based on information related to the selected partial area, and display the image on the second display 412. The information may include coordinate information on the selected partial area. The information may include image data related to the contents displayed on the first display 411. The memory may store instructions that, when executed, cause the processor to display a screen control menu on the first display 411 in response to reception of a second user input, display a crop window on the first display 411 in response to a third user input for selecting a crop button included in the screen control menu, and determine a crop area based on the first user input for adjusting a location and a size of the crop window. The memory may store instructions that, when executed, cause the processor to, when the crop area is determined, detect whether the electronic device is in the folded state, when the electronic device is in the folded state, switch the first display 411 to an off state, and switch the second display 412 to an on state, and display, on the second display 412, a portion of the contents corresponding to the crop area as the image. The memory may store instructions that, when executed, cause the processor to detect whether the electronic device is in an unfolded state while the second display 412 displays the image in the folded state, when the electronic device is in the unfolded state, switch the second display 412 to the off state, and switch the first display 411 to the on state, and display, on the first display 411, to display an entirety of the contents. The memory may store instructions that, when executed, cause the processor to, when a fourth user input is detected while the crop window is displayed on the first display 411, divide the crop window into a first crop window and a second crop window, determine a plurality of crop areas based on a fifth user input for adjusting locations and sizes of the first and second crop windows, and display, on the second display 412, a plurality of portions of the contents corresponding to the plurality of crop areas. The memory may store instructions that, when executed, cause the processor to detect a sixth user input for adjusting the crop area while the second display 412 displays the portion of the contents corresponding to the crop area, and adjust the crop area in response to the sixth user input. The memory may store instructions that, when executed, cause the processor to detect a drag touch on the second display 412 as the sixth user input while the second display 412 displays the portion of the contents corresponding to the crop area, change a coordinate of the crop area in response to the drag touch, and display another portion of the contents on the second display 412 as the image. The memory may store instructions that, when executed, cause the processor to detect a pinch-in/out touch on the second display 412 as the sixth user input while the second display 412 displays the portion of the contents corresponding to the crop area, change a size of the crop area in response to the pinch-in/out touch, and display an enlarged or reduced portion of the contents on the second display 412 as the image.

A method for displaying information by an electronic device 400 according to an embodiment of the disclosure may include an operation of displaying contents on the first display 411, an operation of receiving a first user input for selecting at least a partial area of the displayed contents, and an operation of generating an image based on information related to the selected partial area, and displaying the image on the second display 412. The information may include coordinate information on the selected partial area. The information may include image data related to the contents displayed on the first display 411. The method may include an operation of displaying a screen control menu on the first display 411 in response to reception of a second user input, an operation of displaying a crop window on the first display 411 in response to a third user input for selecting a crop button included in the screen control menu, and an operation of determining a crop area based on the first user input for adjusting a location and a size of the crop window. The method may include an operation of, when the crop area is determined, detecting whether the electronic device is in the folded state, an operation of, when the electronic device is in the folded state, switching the first display 411 to an off state, and switching the second display 412 to an on state, and an operation of displaying, on the second display 412, the portion of the contents corresponding to the crop area as the image. The method may include an operation of detecting whether the electronic device is in an unfolded state while the second display 412 displays the image in the folded state, an operation of, when the electronic device is in the unfolded state, switching the second display 412 to the off state, and switching the first display 411 to the on state, and an operation of, displaying, on the first display 411, an entirety of the contents. The method may include an operation of, when a fourth user input is detected while the crop window is displayed on the first display 411, dividing the crop window into a first crop window and a second crop window, an operation of, determining a plurality of crop areas based on a fifth user input for adjusting locations and sizes of the first and second crop windows, and an operation of displaying, on the second display 412, a plurality of portions of the contents corresponding to the plurality of crop areas. The method may include an operation of detecting a sixth user input for adjusting the crop area while the second display 412 displays the portion of the contents corresponding to the crop area, and an operation of adjusting the crop area in response to the sixth user input. The adjusting operation may include an operation of detecting a drag touch on the second display 412 as the sixth user input while the second display 412 displays the portion of the contents corresponding to the crop area, an operation of changing a coordinate of the crop area in response to the drag touch, and displaying another portion of the contents on the second display 412 as the image. The adjusting operation may include an operation of detecting a pinch-in/out touch on the second display 412 as the sixth user input while the second display 412 displays the portion of the contents corresponding to the crop area, an operation of changing a size of the crop area in response to the pinch-in/out touch, and displaying an enlarged or reduced portion of the contents on the second display as the image.

Figure 4:
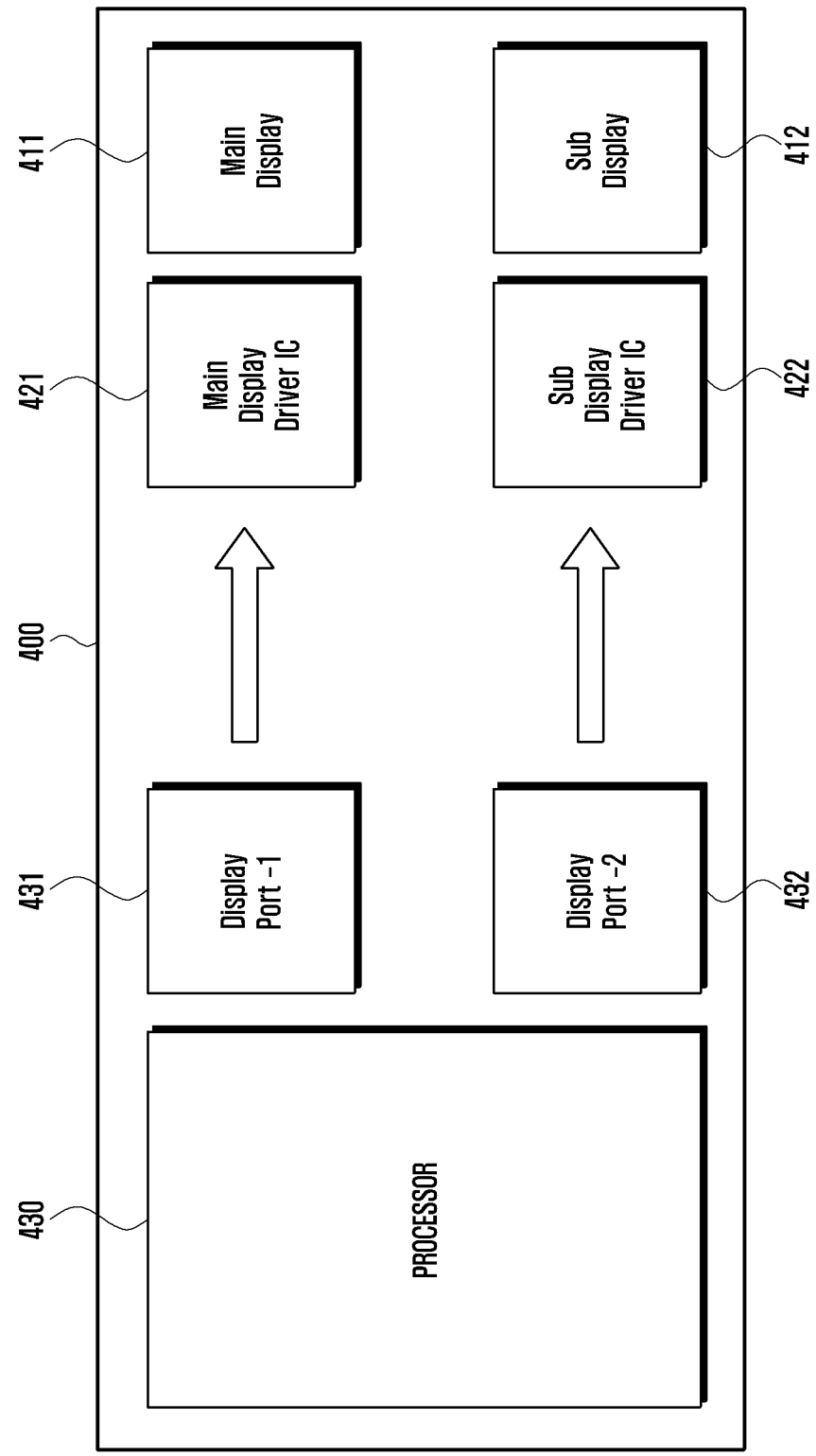
FIG. 4 is a block diagram of an electronic device according to an embodiment of the disclosure.

FIG. 4 is a block diagram of an electronic device according to an embodiment of the disclosure.

Referring to FIG. 4, an electronic device 400 (e.g., the electronic device 101 of FIG. 1) according to an embodiment may include a main display 411 (e.g., the display 230 of FIG. 2), a sub-display 412 (e.g., the sub-display 252 of FIG. 2), a main display driver IC (DDI) 421, a sub-DDI 422, and a processor 430 (e.g., the processor 120 of FIG. 1). The processor 430 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the main display 411 (e.g., the first display) may be disposed on inner surfaces of the foldable housings 210 and 220 that face each other when the electronic device 400 is in the folded state. For example, the main display 411 may be disposed on a first surface (e.g., the first surface 211 of FIG. 2) of the first housing structure (e.g., the first housing structure 210 of FIG. 2) and a third surface (e.g., the third surface 221 of FIG. 2) of the second housing structure (e.g., the second housing structure 220 of FIG. 2) such that opposite sides of the main display 411 face each other when the electronic device 400 is in the folded state. For example, the main display 411 may extend from the first surface 211 to the third surface 221 and substantially overlap the first surface 211 and the third surface 221.

According to an embodiment, the sub-display 412 (e.g., the second display) may be exposed through at least a portion of the outer surfaces 212 or 222 of the foldable housings 210 and 220 when the electronic device 400 is in the folded state. For example, the sub-display 412 may be disposed to be viewed through at least a portion of a second surface (e.g., the second surface 212 of FIG. 2) of the first housing structure 210 or a fourth surface (e.g., the fourth surface 222 of FIG. 2) of the second housing structure 220.

According to an embodiment, the main DDI 421 may include an interface module, a memory (e.g., a buffer memory), an image processing module, and/or a mapping module. The main DDI 421, for example, may receive, through the interface module, image data or image information including an image control signal corresponding to a command for controlling the image data from another element of the electronic device 400. For example, the main DDI 421 may receive the image information from the processor 430 or from an auxiliary processor 430 (e.g., a graphic processing device) that is operated independently from the function of the processor 430. According to an embodiment, the main DDI 421 may communicate with a touch circuit or a sensor module through the interface module. According to an embodiment, the main DDI 421 may store at least a portion of the received image information in the memory, for example, in units of frames. According to an embodiment, the image processing module, for example, may pre-process or post-process (e.g., adjust resolution, brightness, or size) of at least some of the image data at least on the basis of the characteristics of the image data or the characteristics of the main display 411. According to an embodiment, the mapping module may generate voltage values or current values corresponding to the image data pre-processed or post-processed through the image processing module. According to an embodiment, the voltage values or the current values may be generated at least partly on the basis of the attributes of the pixels of the main display 411 (e.g., the arrangement (an RGB stripe or a pentile structure) of the pixels or the sizes of the sub-pixels). At least some pixels of the main display 411, for example, may be driven at least partly on the basis of the voltage values or the current values to display, through the main display 411, visual information (e.g., text, image, icon, etc.) corresponding to the image data.

According to an embodiment, the sub-DDI 422 may drive the sub-display 412 such that an image based on the image information received from the processor 430 is displayed. According to an embodiment, the sub-DDI 422 is simply different from the main DDI 421 in that it drives the sub-display 412, but may include elements that are the same as or similar to those of the main DDI 421. For example, the sub-DDI 422 may include an interface module, a memory (e.g., a buffer memory), an image processing module, and/or a mapping module, which all perform similar functions of those of the main DDI 421.

According an embodiment, the processor 430 may include a first display port 431 operatively connected to the main DDI 421, and a second display port 432 operatively connected to the sub-DDI 422. For example, the processor 430 may transmit first image information to the main DDI 421 through the first display port 431, and may transmit second image information to the sub-DDI 422 through the second display port 432.

According to an embodiment, the first image information and the second image information may be the same. For example, the processor 430 may transmit image information including the same image data to the main DDI 421 and the sub-DDI 422.

According to another embodiment, the image data included in the second image information may include at least some of the image data included in the first image information. For example, the processor 430 may receive an input for selecting some of the first image data (e.g., the entire image displayed on the main display 411) from the user, and may transmit, on the basis of the input, the second image data that are the some of the first image data (e.g., a portion of the entire image displayed on the main display 411) to the sub-DDI 422.

In another embodiment, the processor 430 may transmit the same image data to the main DDI 421 and the sub-DDI 422, and may additionally transmit coordinate information based on the user input to the sub-DDI 422. For example, the coordinate information may be coordinate information (e.g., coordinates of the second image data) that defines some of the first image data selected by the user, and the sub-DDI 422 may drive the sub-display 412 such that some of the first image data (e.g., the second image data) are displayed on the basis of the coordinate information.

Figure 5:
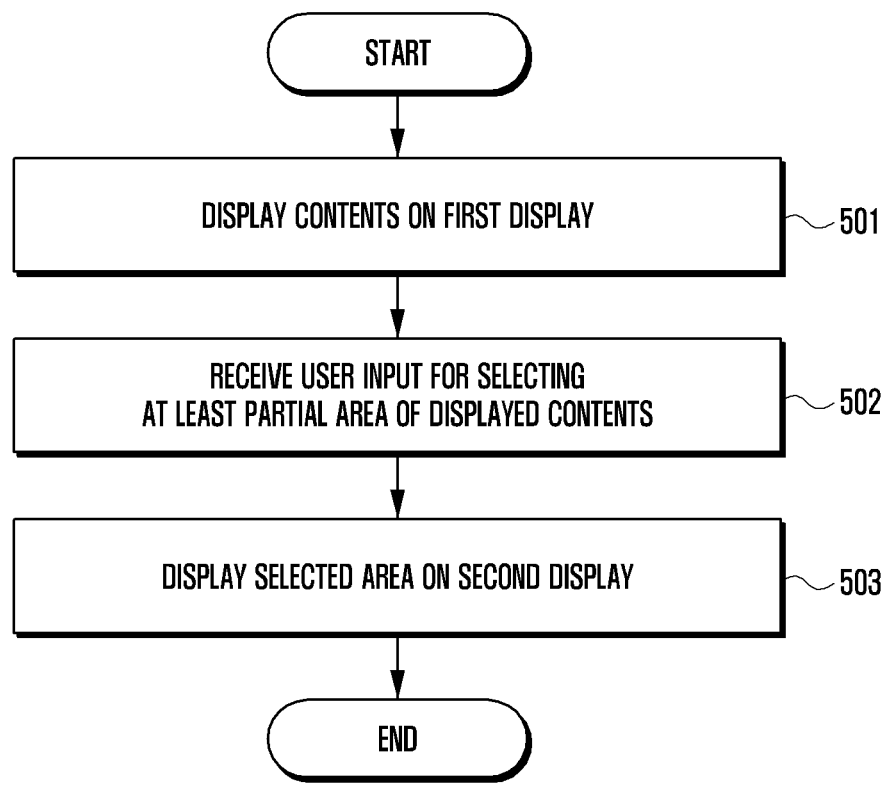
FIG. 5 is a flowchart illustrating an operation of an electronic device according to an embodiment of the disclosure.
Figure 6A:
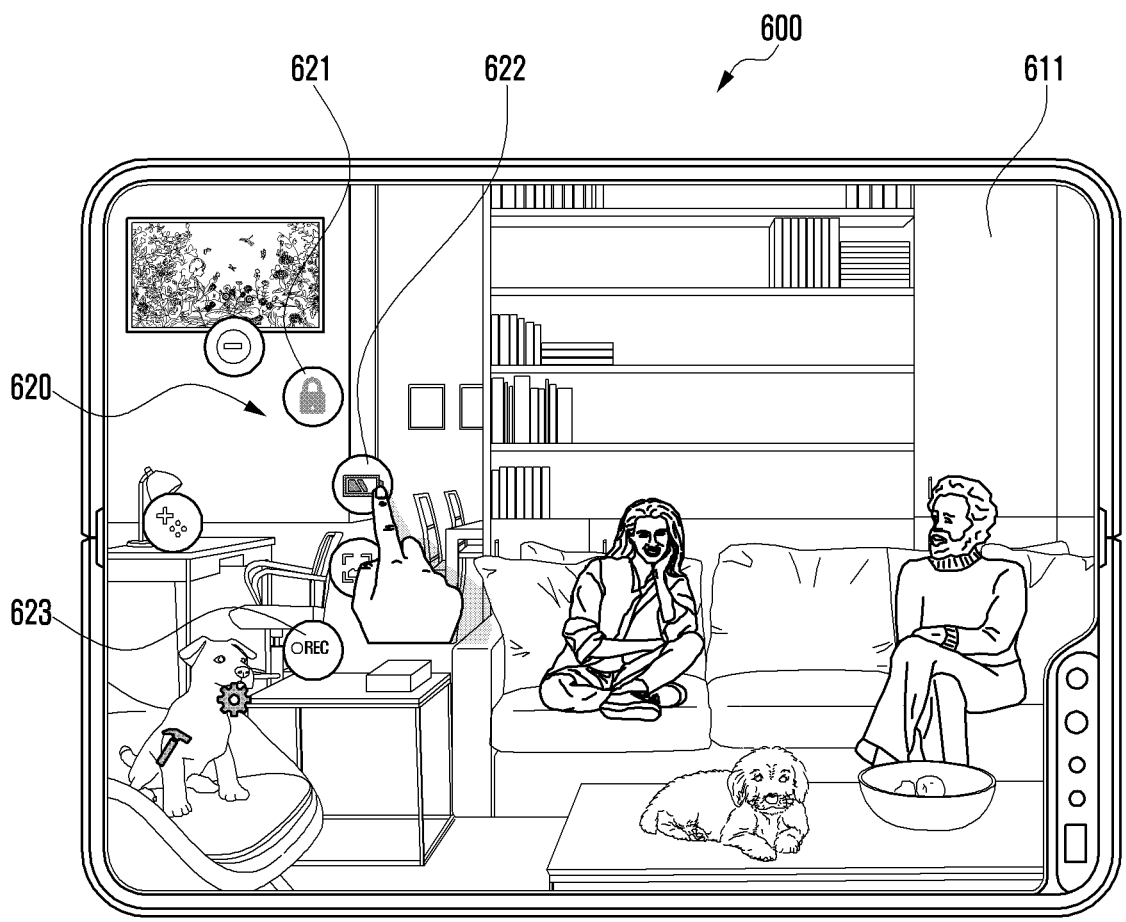
FIG. 6A is a view illustrating an example in which an electronic device displays at least a portion of an image displayed on a first display through a second display according to an embodiment of the disclosure.
Figure 6B:
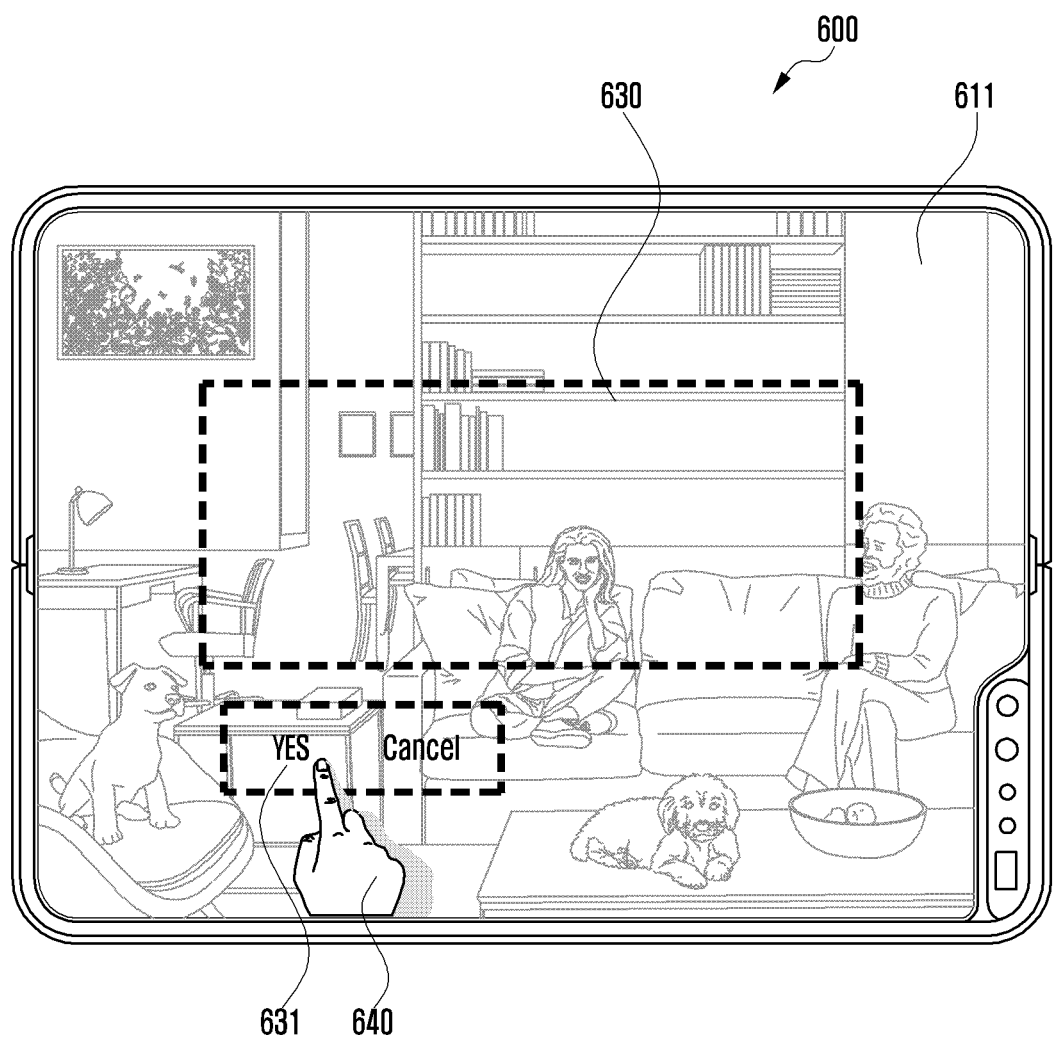
FIG. 6B is another view illustrating the example in which an electronic device displays at least a portion of an image displayed on a first display through a second display according to an embodiment of the disclosure.
Figure 6C:
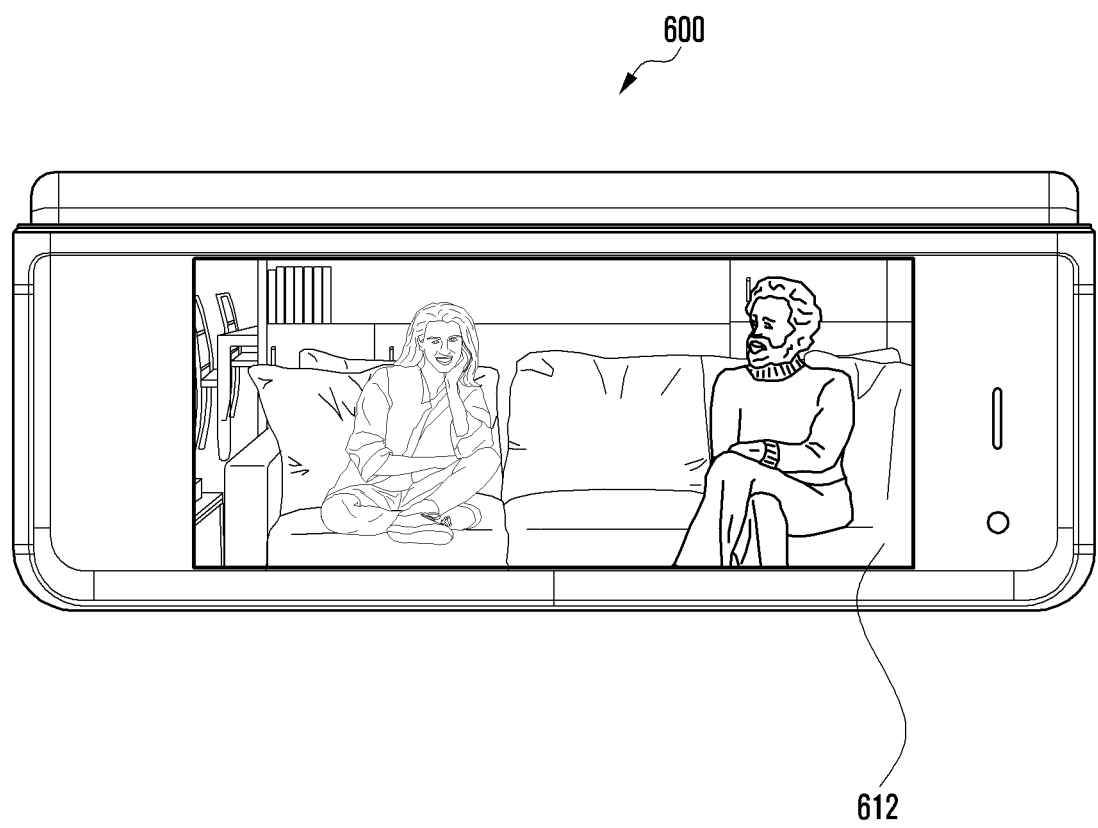
FIG. 6C is yet another view illustrating the example in which an electronic device displays at least a portion of an image displayed on a first display through a second display according to an embodiment of the disclosure.
Figure 7A:
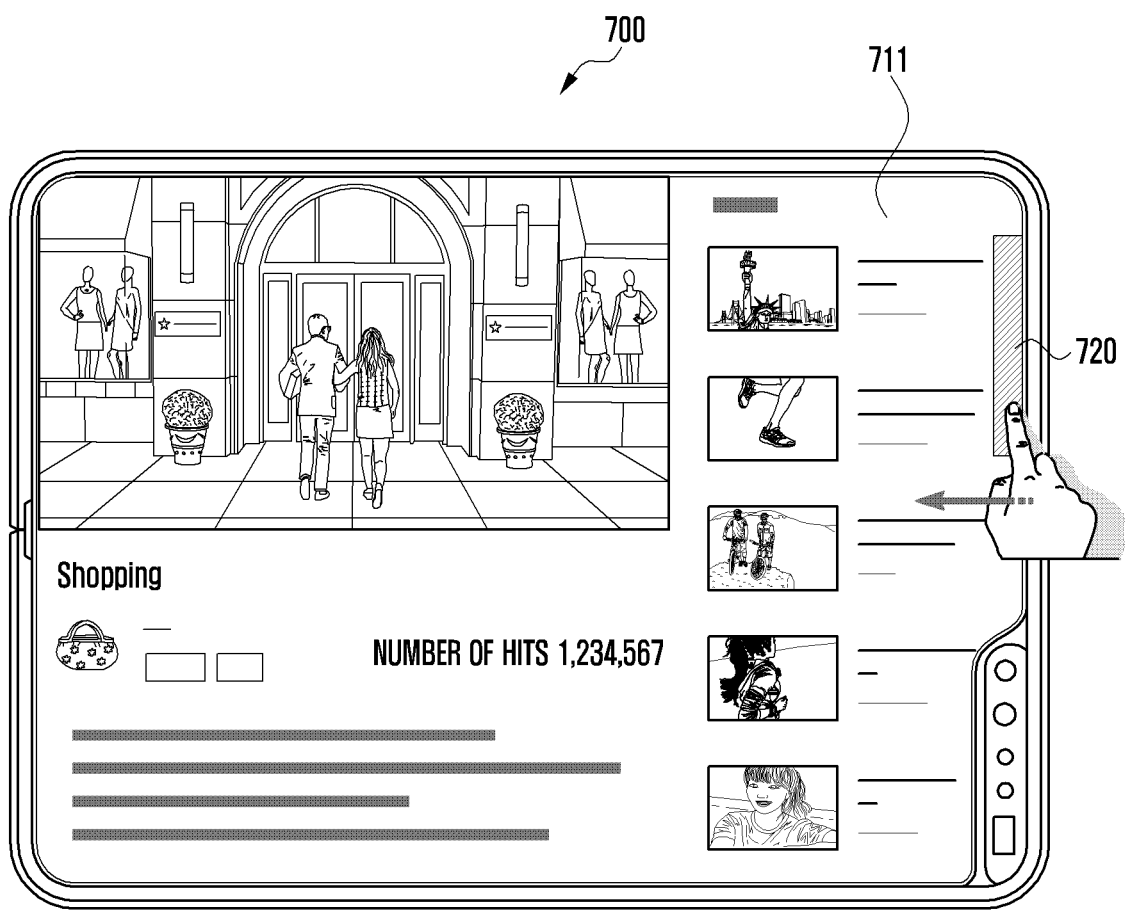
FIG. 7A is a view illustrating another example in which an electronic device displays at least a portion of an image displayed on a first display through a second display according to an embodiment of the disclosure.
Figure 7B:
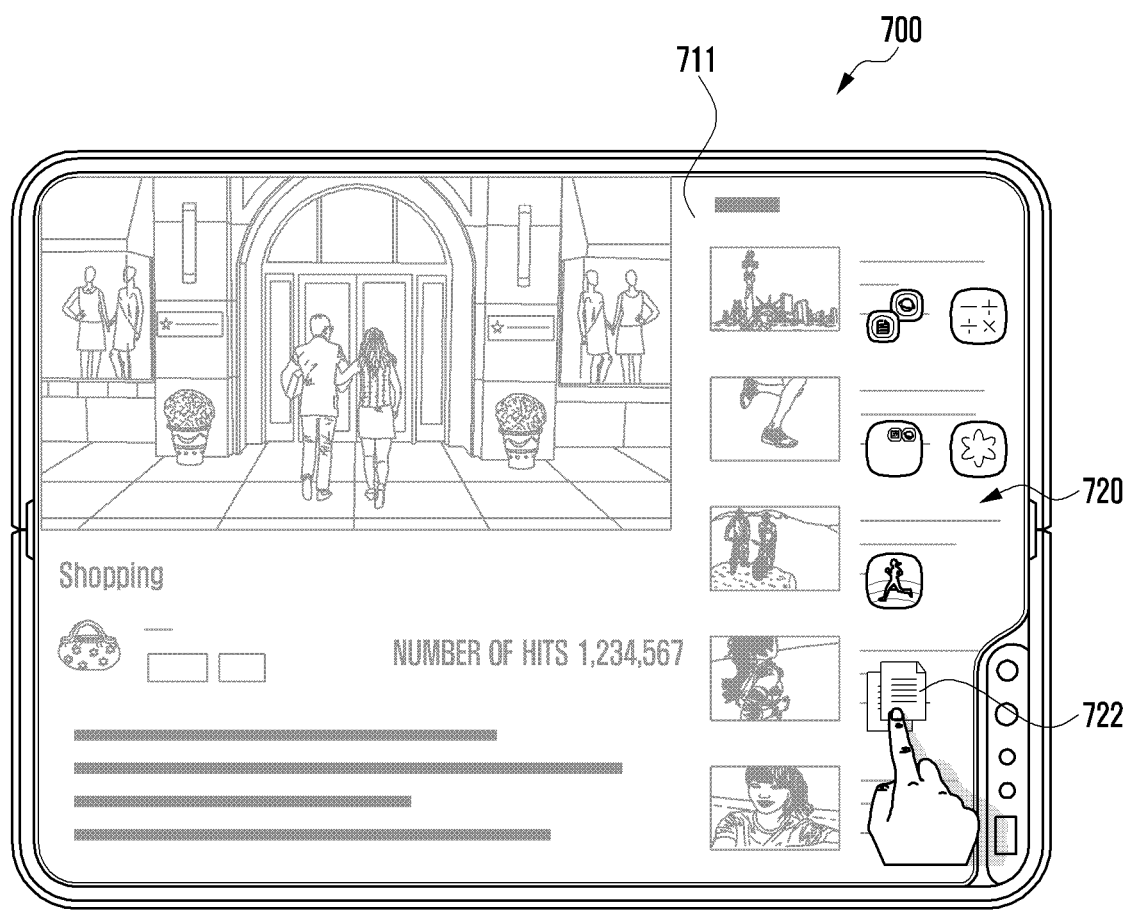
FIG. 7B is another view illustrating the other example in which an electronic device displays at least a portion of an image displayed on a first display through a second display according to an embodiment of the disclosure.
Figure 7C:
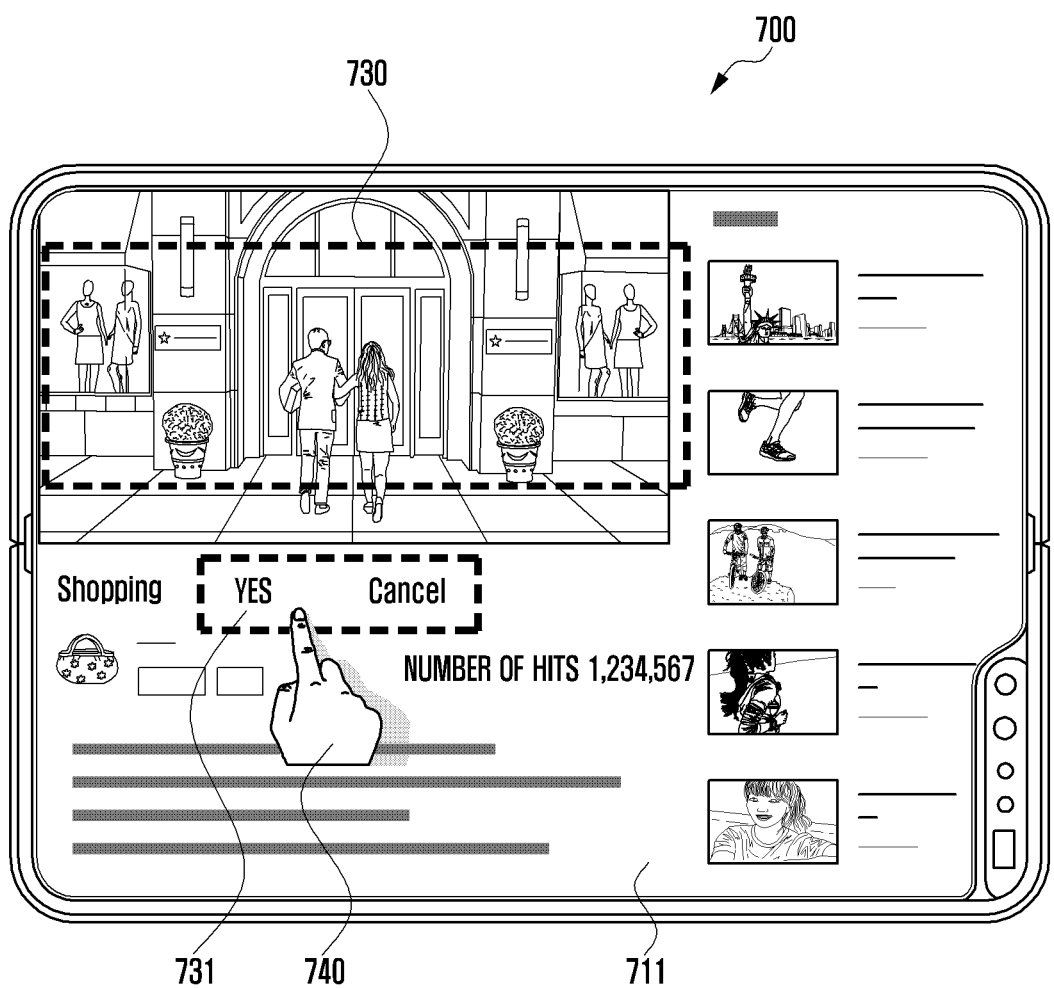
FIG. 7C is yet another view illustrating the other example in which an electronic device displays at least a portion of an image displayed on a first display through a second display according to an embodiment of the disclosure.

FIG. 5 is a flowchart illustrating an operation of an electronic device according to an embodiment of the disclosure. FIG. 6A is a view illustrating an example in which an electronic device displays at least a portion of an image displayed on a first display through a second display according to an embodiment of the disclosure, FIG. 6B is another view illustrating the example in which an electronic device displays at least a portion of an image displayed on a first display through a second display according to an embodiment of the disclosure, and FIG. 6C is yet another view illustrating the example in which an electronic device displays at least a portion of an image displayed on a first display through a second display according to an embodiment of the disclosure. FIG. 7A is a view illustrating another example in which an electronic device displays at least a portion of an image displayed on a first display through a second display according to an embodiment of the disclosure, FIG. 7B is another view illustrating the other example in which an electronic device displays at least a portion of an image displayed on a first display through a second display according to an embodiment of the disclosure, FIG. 7C is yet another view illustrating the other example in which an electronic device displays at least a portion of an image displayed on a first display through a second display according to an embodiment of the disclosure.

Hereinafter, operations of an electronic device according to certain embodiments of the disclosure will be described with reference to FIGS. 5 to 7.

In operation 501, an electronic device (e.g., the electronic device 600 of FIG. 6) according to an embodiment may display contents on a first display (e.g., the first display 611 of FIG. 6). For example, a processor (e.g., the processor 430 of FIG. 4) may execute an application program, and may transmit image information to a first DDI (e.g., the main DDI 421 of FIG. 4) such that a user interface related to the executed application program is displayed. The first DDI 421, for example, may drive the first display 611 such that the user interface is displayed on the basis of the image information received from the processor 430.

In operation 502, the electronic device 600 according to an embodiment may receive a user input for selecting at least a partial area of contents displayed on the first display 611. According to an embodiment, the operation 502 may include the below sub-operations. First, the electronic device 600 may display a screen control menu in response to a first user input. Next, the electronic device 600 may display a crop window 630 in response to a second user input for selecting a crop button (e.g., the crop button 622 of FIG. 6A) included in the screen control menu. Finally, the electronic device 600 may adjust the location and the size of the crop window 630 and determining a crop area on the basis of a third user input for determining the crop area.

For example, as illustrated in FIG. 6A, the electronic device 600 may display the screen control menu 620 on the first display 611 in response to the reception of a specific input from the user during the display of the contents. The screen control menu 620, for example, may be a control menu provided by a launcher program, and may be activated in response to pressing of a specific physical button by the user or in response to a specific touch input (e.g., a drag gesture). According to an embodiment, the screen control menu 620 may include a lock button 621 for switching the screen into a locked state, a crop button 622 for switching to a power-saving crop mode, or a record button 623 for recording the screen. For example, the power saving crop mode may refer to a state in which the electronic device 600 displays, through the second display 612, at least a portion of the image currently displayed on the first display 611. According to an embodiment, the electronic device 600 may receive a user input for selecting the crop button 622 from the screen control menu 620 while contents are displayed, and may display the crop window 630 as illustrated in FIG. 6B in response to a user input for selecting the crop button 622. According to an embodiment, the electronic device 600 may adjust the location and the size of the crop window 630 on the basis of a touch input of the user and may determine a part located in the interior of the crop window 630, which is being currently displayed, as a crop area in response to selection 640 of "YES" 631 by the user.

As another example, as illustrated in FIG. 7A, the screen control menu that may be displayed while the electronic device 700 is displaying content may be an edge panel 720 that may be called by the user from a corner of one side of the display 711 using a slide or drag gesture. For example, the edge panel 720 may be called in response to user input of a drag gesture started from one side or corner of the first display 711. Referring to FIG. 7B, the edge panel 720 may include icons of an application preset by the user, and may include buttons that are the same as or similar to those of the screen control menu 620 illustrated in FIG. 6A. According to an embodiment, the electronic device 700 may receive a user input for selecting the crop button 722 from the screen control menu 720 while contents are displayed, and may display the crop window 730 as illustrated in FIG. 7C in response to a user input for selecting the crop button 722. According to an embodiment, the electronic device 700 may adjust the location and the size of the crop window 730 on the basis of a touch input of the user and may determine a part located in the interior of the crop window 730, which is being currently displayed, as a crop area in response to selection 740 of "YES" 731 by the user.

In operation 503, the electronic device 600 according to an embodiment may display, on the second display 612, the selected area in response to selection of at least a partial area of the contents displayed on the first display 611. For example, as illustrated in FIG. 6C, the electronic device 600 may, if a crop area is determined, display some of the contents that are being displayed on the first display 611, which correspond to the crop area, through the second display 612. According to an embodiment, the processor 430 may transmit, to the second DDI (e.g., the sub-DDI 422 of FIG. 4), image data that are the same as those transmitted to the first DDI 421, and may additionally transmit coordinate information based on the user input. The second DDI 422 may display, on the basis of the coordinate information, some of the contents that are being displayed on the first display 611, which correspond to the crop area, through the second display 612. According to another embodiment, the processor 430 may perform a control to generate a portion of the crop area as image data by using coordinate information received from the touch circuit, transmit the generated image data to the second DDI 442, and the second DDI 442 may cause the second display 612 to display the image data.

According to an embodiment, if a crop area is determined based on user input, the electronic device 600 may further determine whether the electronic device 600 is in the folded state. If so, the electronic device 600 may perform a control to switch the first display 611 to an off state (e.g., an inactive state) and switch the second display 612 to an on state (e.g., an active state) such that the second display 612 displays some of the contents corresponding to the crop area.

According to an embodiment, the electronic device 600 may determine whether the electronic device 600 is unfolded while the second display 612 displays some of the contents corresponding to the crop area. If so, the electronic device 600 may control the first display 611 to, switch the second display 612 to an off state and switch the first display 611 to an on state such that the first display 611 displays the entire image including some images that are being displayed on the second display 612.

Figure 8:
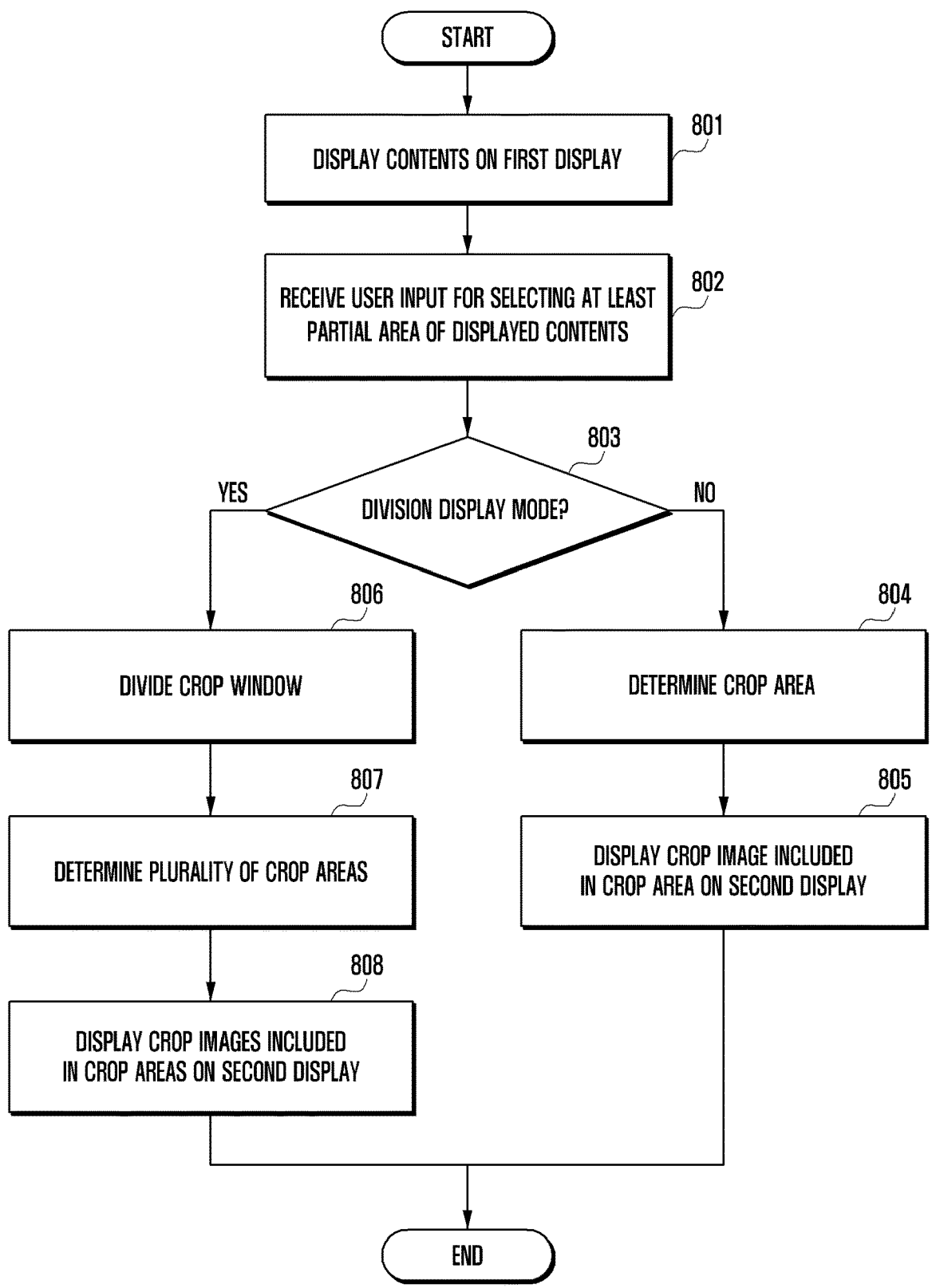
FIG. 8 is a flowchart illustrating an operation of an electronic device according to an embodiment of the disclosure.
Figure 9A:
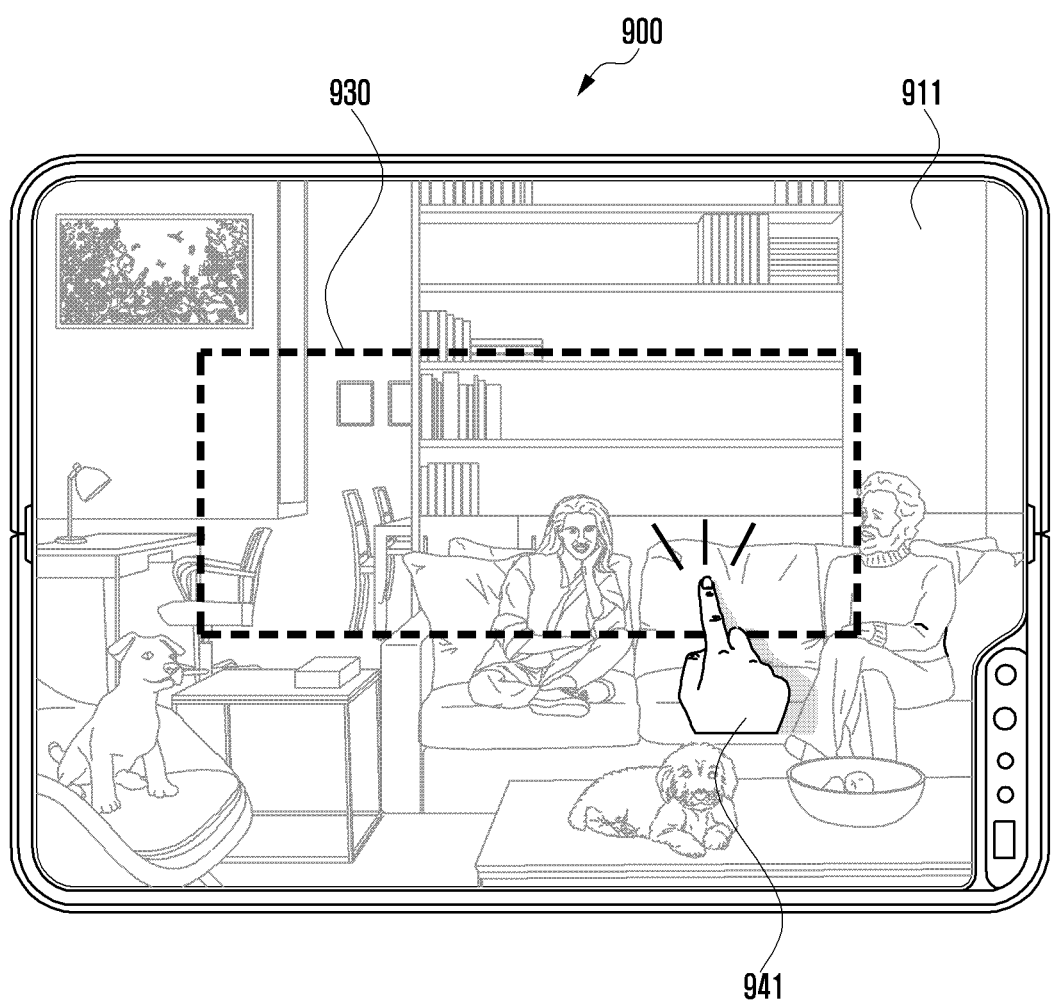
FIG. 9A is a view illustrating an example in which an electronic device displays a plurality of portions of an image displayed on a first display through a second display according to an embodiment of the disclosure.
Figure 9B:
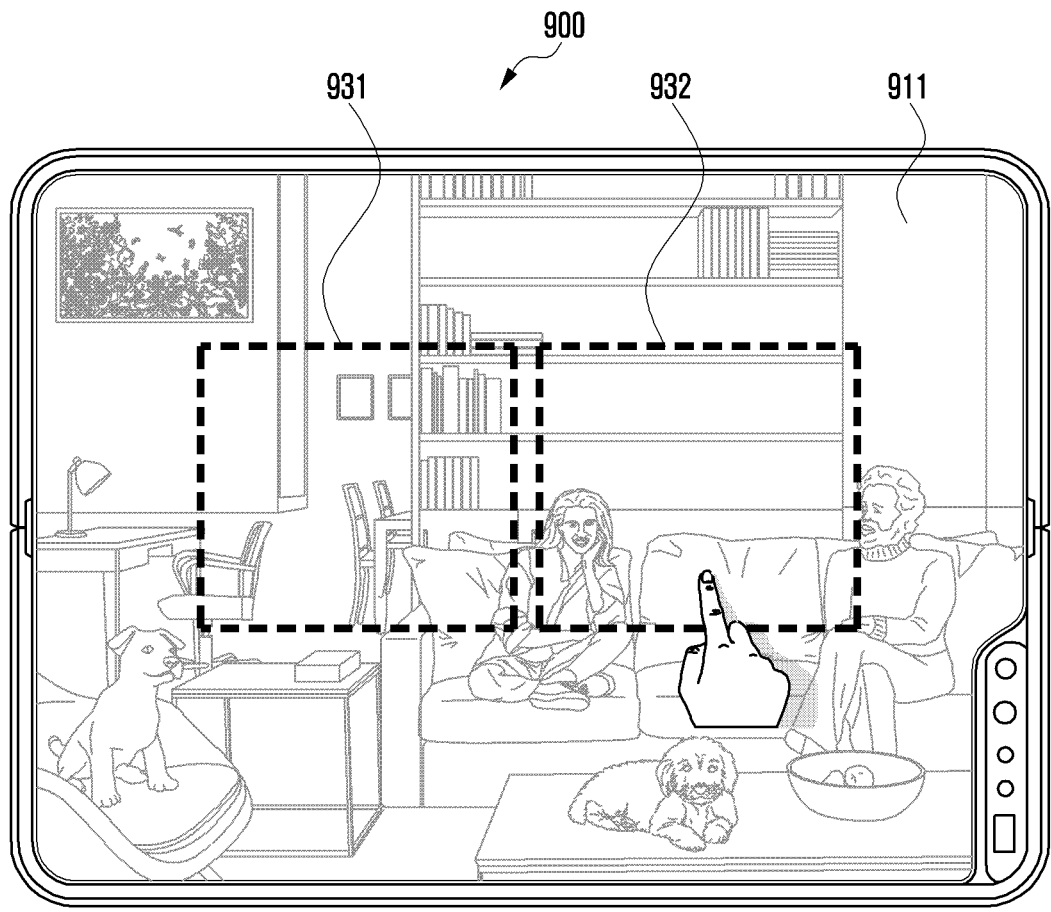
FIG. 9B is another view illustrating the example in which an electronic device displays a plurality of portions of an image displayed on a first display through a second display according to an embodiment of the disclosure.
Figure 9C:
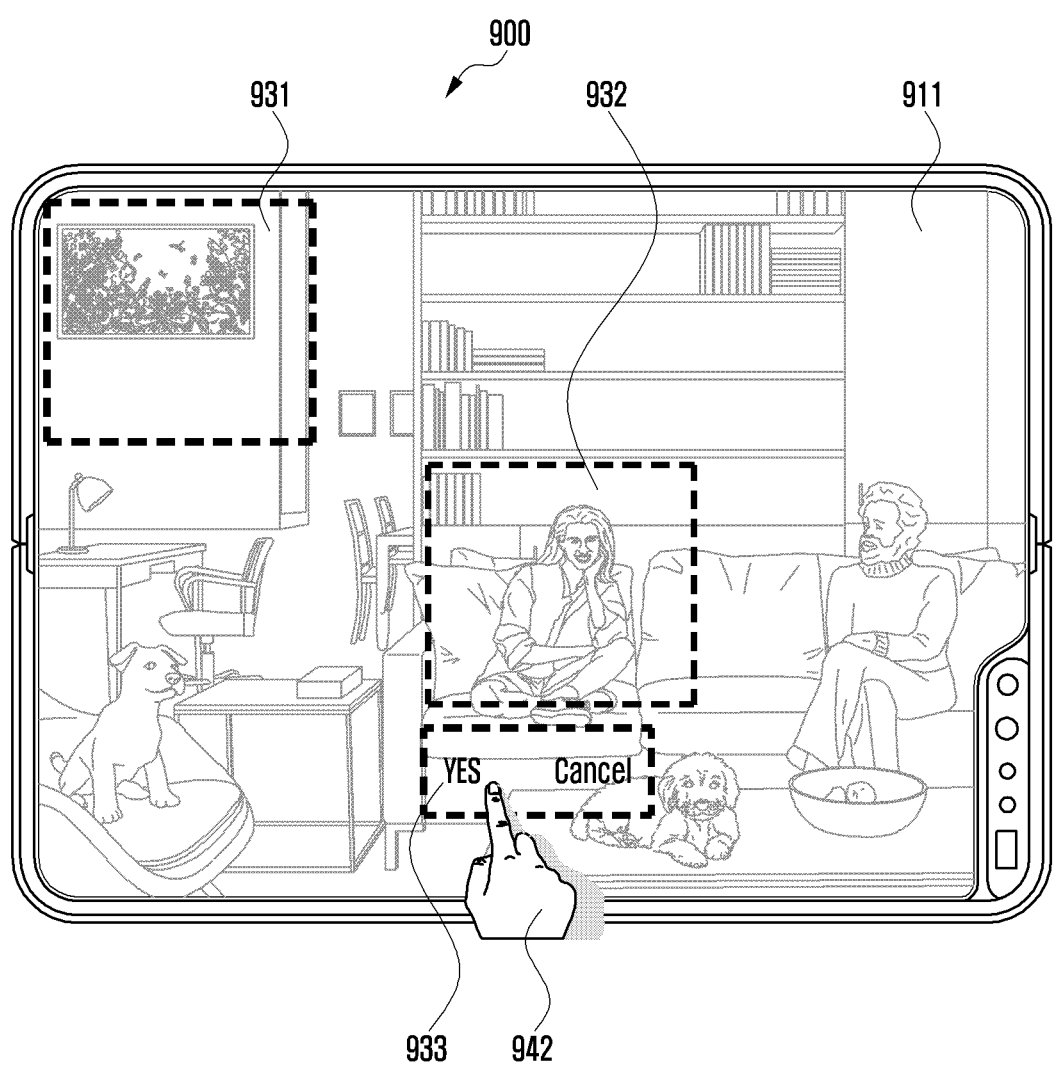
FIG. 9C is yet another view illustrating the example in which an electronic device displays a plurality of portions of an image displayed on a first display through a second display according to an embodiment of the disclosure.
Figure 9D:
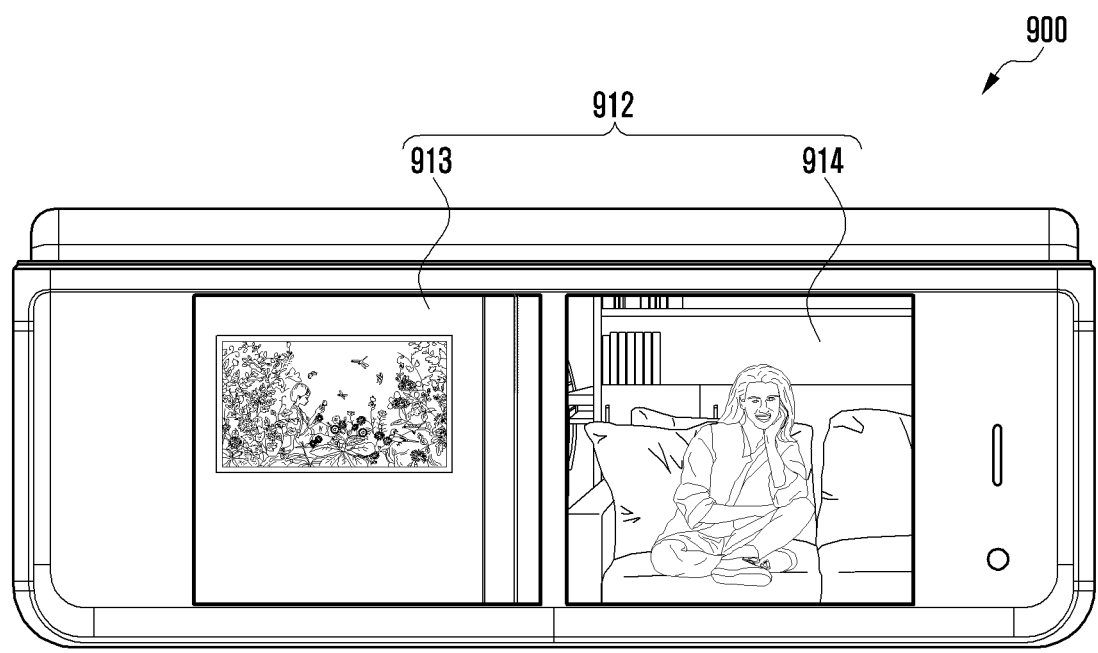
FIG. 9D is still yet another view illustrating the example in which an electronic device displays a plurality of portions of an image displayed on a first display through a second display according to an embodiment of the disclosure.

FIG. 8 is a flowchart illustrating an operation of an electronic device according to an embodiment of the disclosure. FIG. 9A is a view illustrating an example in which an electronic device displays a plurality of portions of an image displayed on a first display through a second display according to an embodiment of the disclosure, FIG. 9B is another view illustrating the example in which an electronic device displays a plurality of portions of an image displayed on a first display through a second display according to an embodiment of the disclosure, FIG. 9C is yet another view illustrating the example in which an electronic device displays a plurality of portions of an image displayed on a first display through a second display according to an embodiment of the disclosure, and FIG. 9D is still yet another view illustrating the example in which an electronic device displays a plurality of portions of an image displayed on a first display through a second display according to an embodiment of the disclosure.

Hereinafter, referring to FIGS. 8-9D, an operation by an electronic device (e.g., the electronic device 900 of FIG. 9) according to an embodiment of the disclosure is described, in which a plurality of portions of an image displayed on a first display (e.g., the first display 911 of FIG. 9) are displayed through a second display (e.g., the second display 912 of FIG. 9).

In operation 801, the electronic device 900 according to an embodiment may display contents on the first display 911. For example, a processor 430 may execute an application program, and may transmit image information to a first DDI (e.g., the main DDI 421 of FIG. 4) such that a user interface related to the executed application program is displayed. The first DDI 421, for example, may drive the first display 911 such that the user interface is displayed on the basis of the image information received from the processor 430.

In operation 802, the electronic device 900 according to an embodiment may receive a user input for selecting at least a partial area of contents displayed on the first display 911. According to an embodiment, the operation 802 may include the below sub-operations. First, the electronic device 900 may display a screen control menu 620 (e.g., the control menu 620 of FIG. 6) in response to a first user input. Next, the electronic device 900 may display a crop window (e.g., the crop window 930 of FIG. 9) in response to a second user input for selecting a crop button (e.g., the crop button 622 of FIG. 6) included in the screen control menu 620. Finally, the electronic device 900 may adjust the location and the size of the crop window 930 and determining a crop area on the basis of a third user input for determining the crop area.

In operation 803, the electronic device 900 according to an embodiment, it may be determine whether a division display mode is activated during the time when the crop area is determined. According to an embodiment, the division display mode may refer to a state in which the electronic device 900 displays, through the second display 912, a plurality of portions of the image displayed through the first display 911. For example, the division display mode may be a state in which the second display 912 is divided into a plurality of areas, for example, a first area (e.g., the first area 913 of FIG. 9D) and a second area (e.g., the second area 914 of FIG. 9D), and some of the contents 931 that are being displayed on the first display 911 are displayed through the first area 913, and other contents 932 are displayed through the second area 932. According to various other embodiments, the number of the areas into which the second display 912 is divided in the division display mode is not limited to two, and may be two or more. According to an embodiment, the electronic device 900 may detect a specific user input (e.g., a double tap touch 941 of FIG. 9A) while the crop window 930 is displayed, and if such a specific user input 941 is received, the electronic device 900 determine to activate the division display mode. For example, if a "double tap touch" 941 in an inner area of the crop window 930 is received, the electronic device 900 may determine to activate the division display mode. According to various other embodiments, the specific user input for activating the division display mode may be some user input other than the "double tap touch" 941.

In operation 804, the electronic device 900 according to an embodiment may, when the mode is not the division display mode (e.g., in the case in which the determination result of operation 803 is "NO"), determine, as the crop area, the portion of the content located within the crop window 930 currently displayed. The determinations of the crop area may be in response to a user input (e.g., selection of "Yes" 631 in FIG. 6B) for determining the crop area.

In operation 805, the electronic device 900 according to an embodiment may display, on the second display 912, the selected crop area in response to selection of at least a partial area of the contents displayed on the first display 911. For example, as illustrated in FIG. 6C, the electronic device 900 may, if the crop area is determined, display a portion of the contents that are being on through the first display 911 corresponding to the crop area through the second display 912.

In operation 806, the electronic device 900 according to an embodiment may, in the division display mode (e.g., in the case in which the determination result of operation 803 is "Yes"), divide the crop window 930 and display a plurality of crop windows. For example, the electronic device 900, as illustrated in FIG. 9A, may detect the "double tap touch" 941 in the inner area of the crop window while the crop window 930 is displayed. Referring to FIG. 9B, the electronic device 900 may divide the crop window 930 into the first crop window 931 and the second crop window 932 in response to the "double tap touch" 941, and may display the first crop window 931 and the second crop window 932 on the first display 911.

In operation 807, the electronic device 900 according to an embodiment may adjust the sizes of the first crop window 931 and the second crop window 932 on the basis of user inputs, and may determine a plurality of crop areas in response to a user input (e.g., selection 942 of "Yes" 933 by the user) for determining the crop area. For example, the electronic device 900, as illustrated in FIG. 9C, may adjust the locations and sizes of the first crop window 931 and the second crop window 932 on the basis of touch inputs by the user, and may determine, in response to selection 942 of the "Yes" 933 button by the user, portions located within the first crop window 931 and the second crop window 932 as the crop areas.

In operation 808, the electronic device 900 according to an embodiment may, if the plurality of crop areas are determined, display, on the second display 912, the cropped images corresponding to the crop areas. For example, as illustrated in FIG. 9D, the electronic device 900 may divide the second display 912 into a plurality of areas, for example, the first area 913 and the second area 914, and may display, through the first area 913, a first crop image included in the first crop window 931 as some of the contents that are being displayed through the first display 911, and may display, through the second area 914, a second crop image included in the second crop window 932 as other contents that are being displayed through the first display 911.

Figure 10:
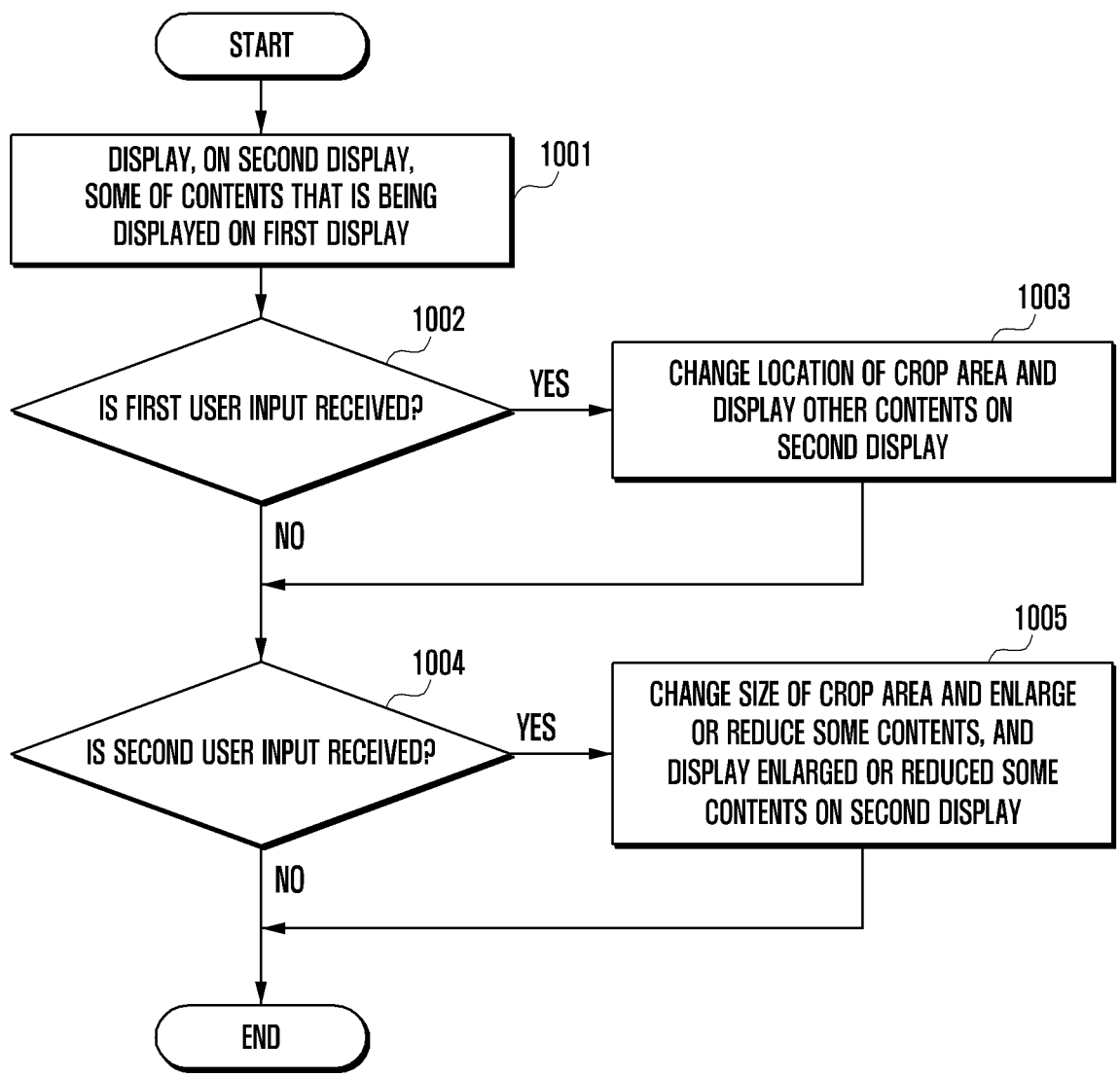
FIG. 10 is a flowchart illustrating an operation of controlling a crop image displayed through a second display by an electronic device according to an embodiment of the disclosure.

FIG. 10 is a flowchart illustrating an operation of controlling a crop image displayed through a second display by an electronic device according to an embodiment of the disclosure. FIGS. 11A to 11D are view illustrating an example in which an electronic controls a crop image displayed through a second display according to an embodiment.

Hereinafter, referring to FIGS. 10 and 11, an operation of controlling a crop image displayed through the second display 1112 by the electronic device 1100 according to an embodiment of the disclosure will be described.

In operation 1001, the electronic device 1100 according to an embodiment may display, on the second display 1112 in the folded state, some of the contents that are being displayed on the first display 1111. For example, operation 1001 may be the same as or similar to operation 503 of FIG. 5 or operation 808 of FIG. 8.

Figure 11A:
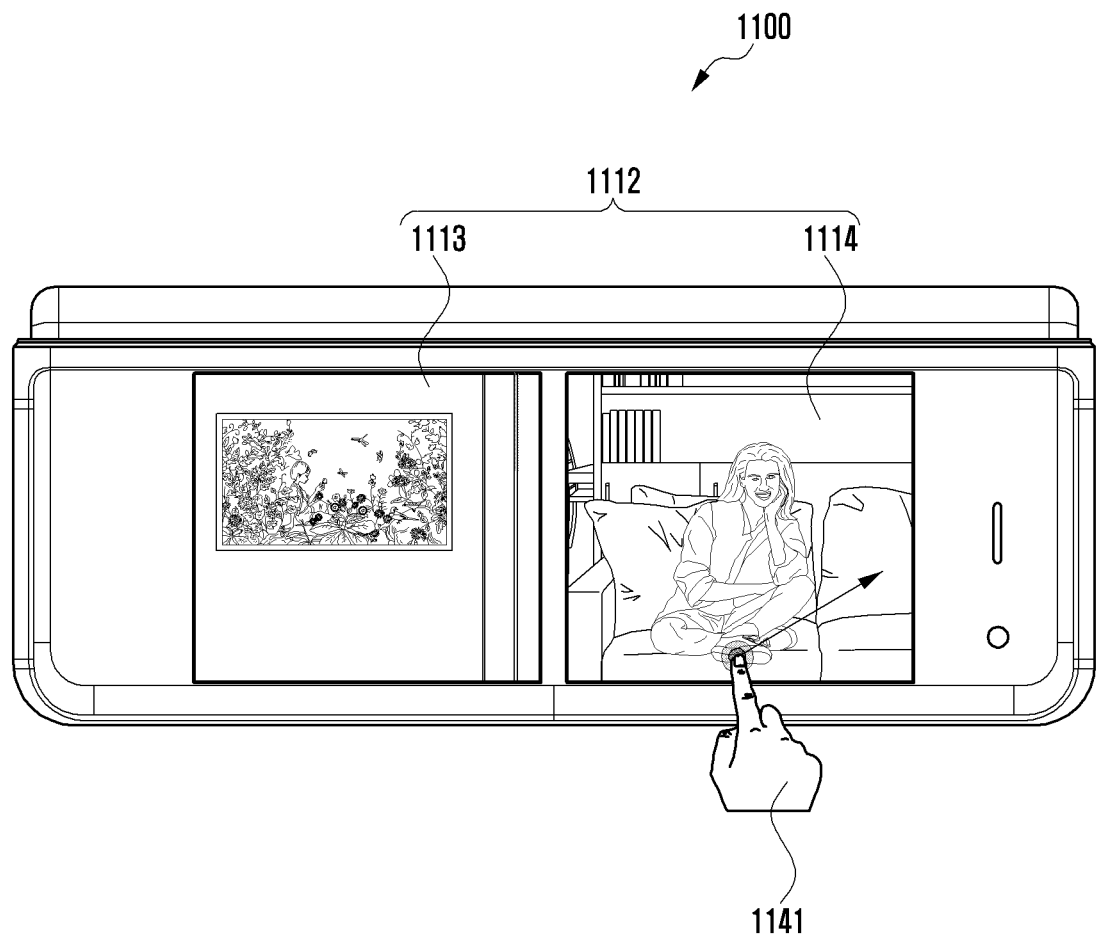
FIGS. 11A to 11D are view illustrating an example in which an electronic controls a crop image displayed through a second display according to an embodiment.
Figure 11B:
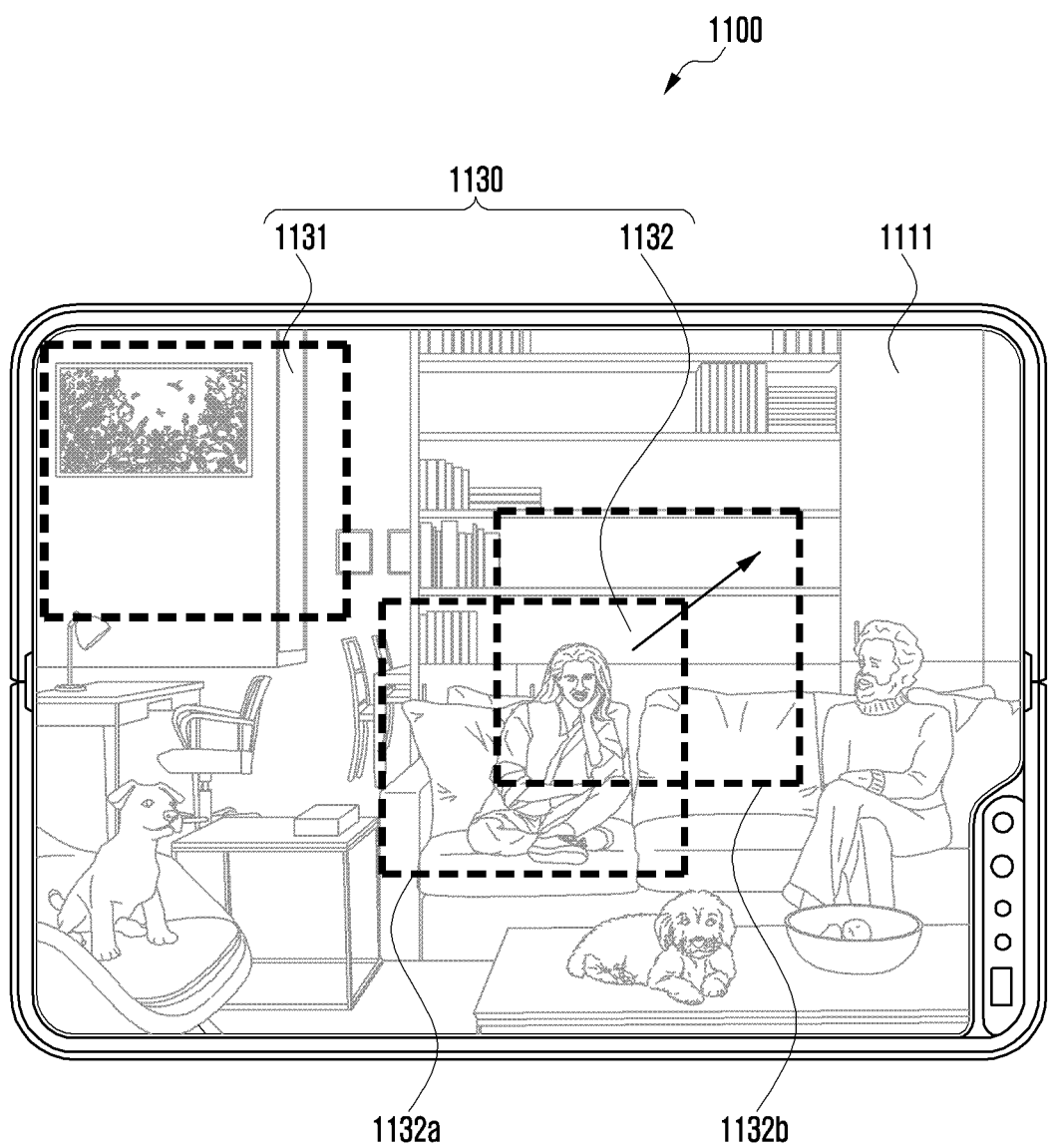

In operations 1002 and 1003, the electronic device 1100 according to an embodiment may detect a first user input for adjusting the location of the crop area that is being displayed on the second display 1112. For example, as illustrated in FIG. 11A, the electronic device 1100 may detect a drag touch 1141 through the second display 1112 while the second display 1112 displays in the folded state some of the contents that are being displayed on the first display 1111. According to an embodiment, when the electronic device 1100 is in the division display mode, the electronic device 1100 may adjust the location of the crop area and the content displayed on the basis of the drag touch 1141. For example, the electronic device 1100 may change the location of the first crop area if a drag touch is detected through the first area 1113 that is displaying the first crop area, and may display, through the first area 1113, some of the contents corresponding to the changed first crop area. The electronic device 1100 may change the location of the second crop area if a drag touch is detected through the second area 1114 that is displaying the second crop area, and may display, through the second area 1114, the others of the contents corresponding to the changed second crop area. The example illustrated in FIGS. 11A and 11B may be when the electronic device 1100 changes the location of the second crop area from being based on a first coordinate 1132a to a second coordinate 1132b in response to a drag touch by the user through the second area 1114.

According to various different embodiments, the "drag touch" 1141 is simply one example of the first user input for adjusting the location of a crop area.

Figure 11C:
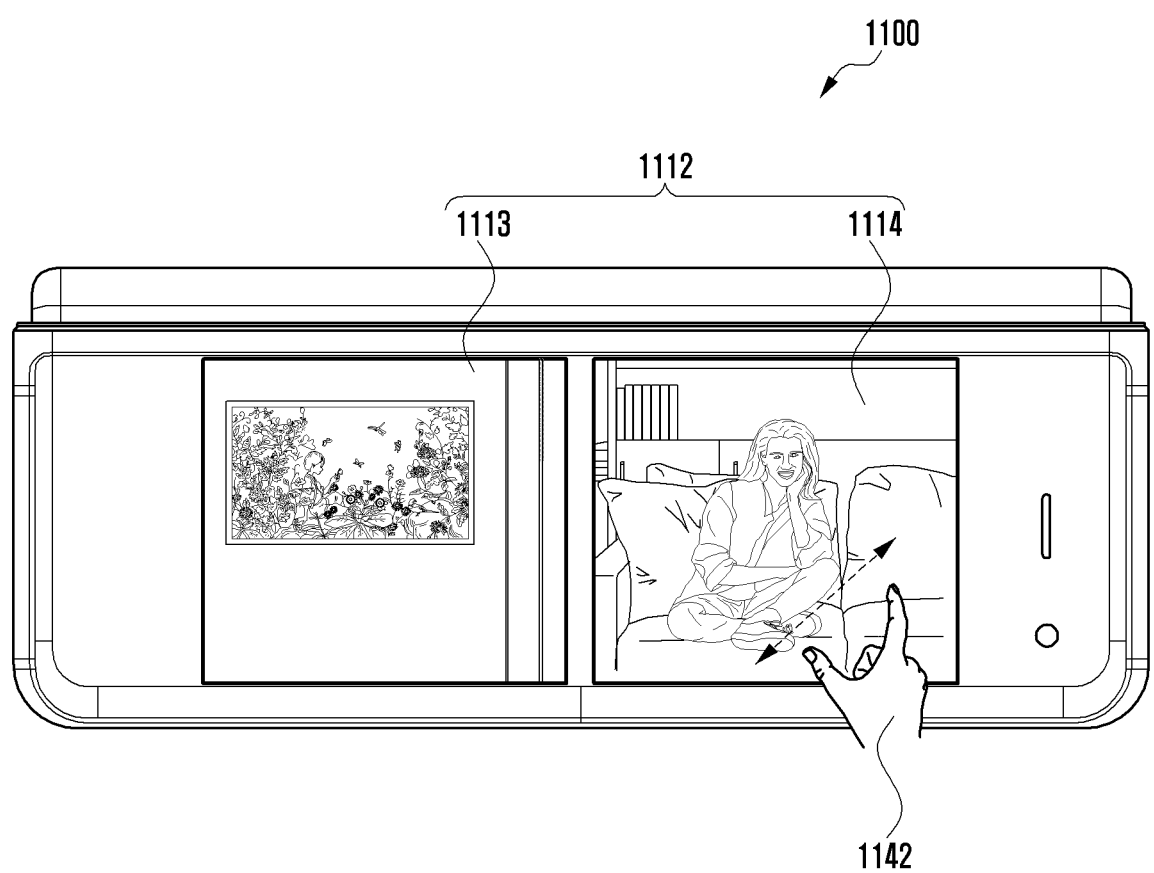
Figure 11D:
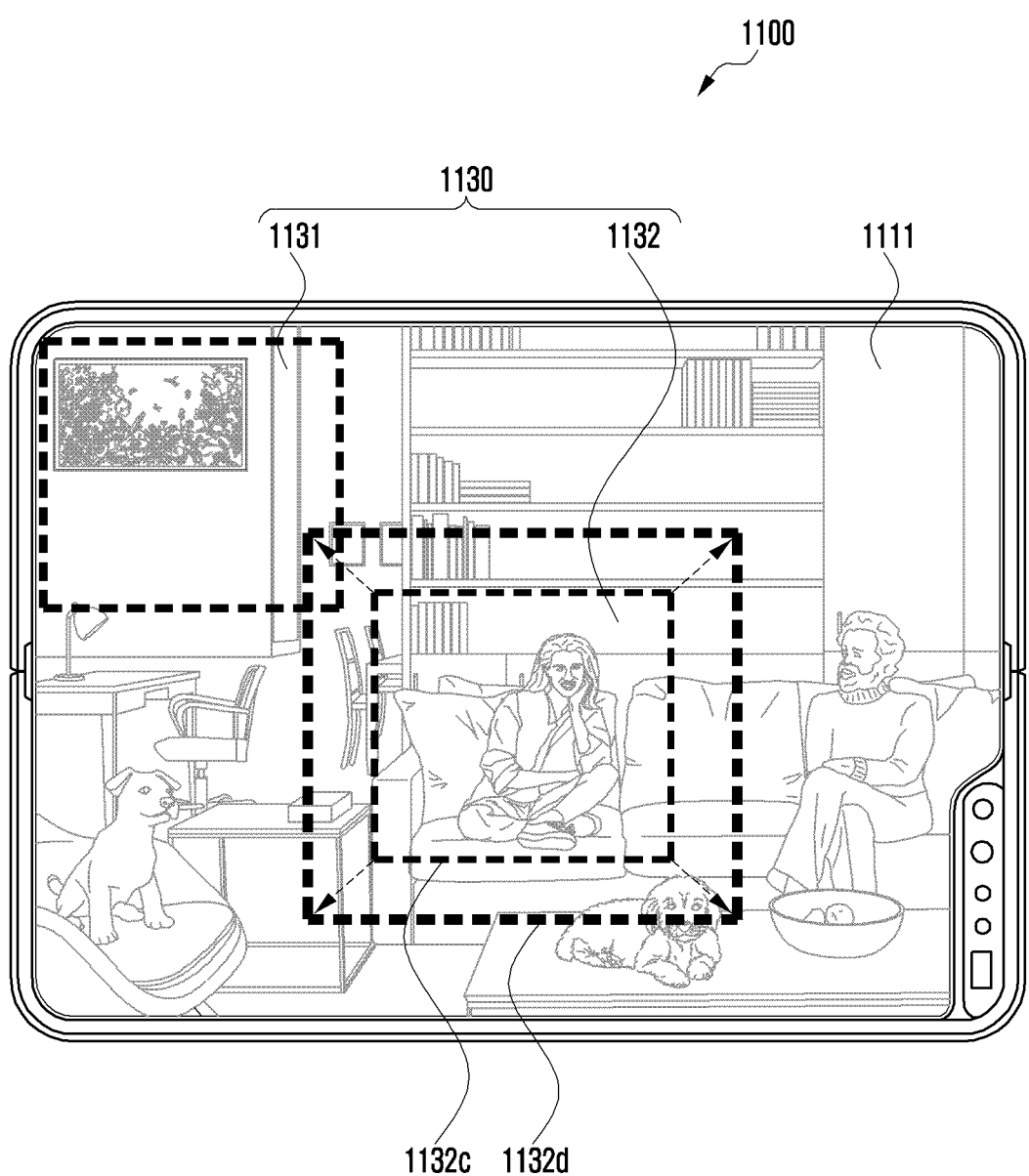

In operations 1004 and 1005, the electronic device 1100 according to an embodiment may detect a second user input for adjusting the location of the crop area that is being displayed on the second display 1112. For example, as illustrated in FIG. 11C, the electronic device 1100 may detect a pinch-in touch or a pin-out touch 1142 through the second display 1112 while the second display 1112 displays in the folded state some of the contents that are being displayed on the first display 1111. For example, the pin-in touch may refer to a multi-touch gesture by which touch points detected at two different points become closer. The pin-out touch may refer to a multi-touch gesture by which touch points detected at two different points become more distant. According to an embodiment, when the electronic device 1100 is in the division display mode, the electronic device 1100 may adjust the size of the crop area on the basis of the pinch-in/out touch 1142. For example, the electronic device 1100 may change the size of the first crop window 1131 if a pinch-in/out touch is detected through the first area 1113 that is displaying the first crop area 1131, and may display some of the contents corresponding to the changed first crop window 1131 through the first area 1113. The electronic device 1100 may change the size of the second crop window 1132 if a pinch-in/out touch is detected through the second area 1114 that is displaying the second crop area, and may display, through the second area 1114, the others of the contents corresponding to the changed second crop window 1132. The example illustrated in FIGS. 11C and 11D may be when the electronic device 1100 changes the size of the second crop window 1132 from a first size 1132c to a second size 1132d in response to a pinch-in touch 1142 by the user through the second area 1114. In the instant disclosure, the adjustment of the size of the crop area may crop some of the contents that are being displayed on the first display 1111 or include additional contents. As such, the electronic device 1100 may enlarge or reduce the contents corresponding to the crop area in response to the pinch-in/out touch 1142 by the user.

Figure 12:
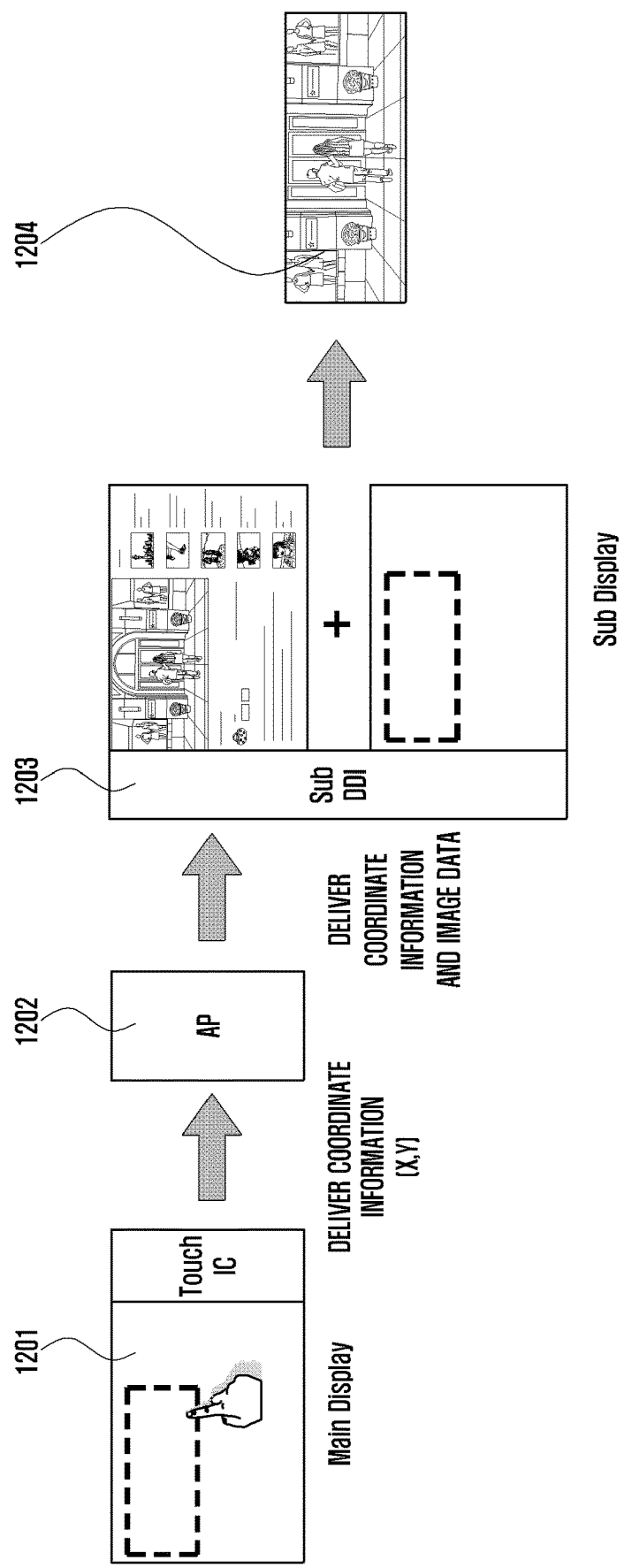
FIG. 12 is a conceptual view illustrating the displaying of a crop image through a second display according to an embodiment.
Figure 13:
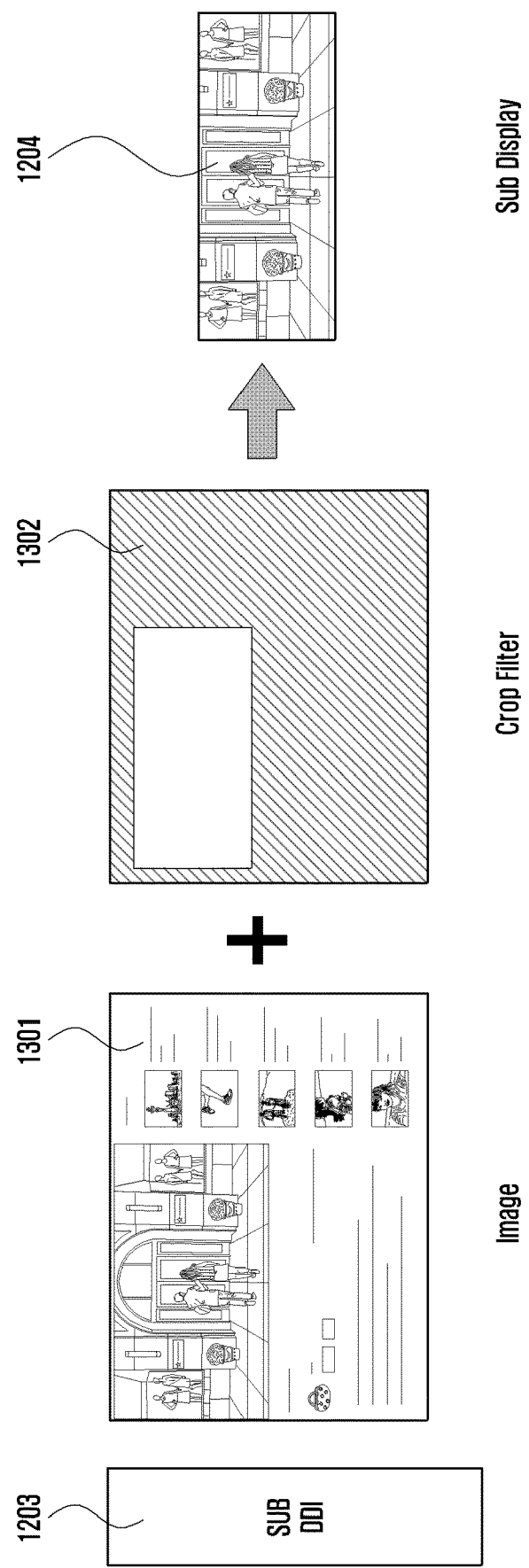
FIG. 13 is a conceptual view of, by a sub-DDI, an electronic device, generating a crop image according to an embodiment of the disclosure.

FIG. 12 is a conceptual view illustrating the displaying of a crop image through a second display according to an embodiment. FIG. 13 is a conceptual view illustrating generation of a crop image by a sub-DDI according to an embodiment.

Referring to FIG. 12, in an electronic device (e.g., the electronic device 400 of FIG. 4) according to an embodiment of the disclosure, an operation of cropping and displaying some of the contents that are being displayed on a main display 1201 (e.g., the main display 411 of FIG. 4) by a sub-display 1204 (the sub-display 412 of FIG. 4) may include the following sequences. According to an embodiment, the electronic device 400 may, while the contents are displayed on the main display 1201, receive a user input for selecting at least a partial area of the contents through a touch IC. For example, the electronic device 400 may display a crop window (e.g., the crop window 630 of FIG. 6) on the main display 1201, and may determine a crop area on the basis of a user input for adjusting the location and the size of the crop window 630.

According to an embodiment, the electronic device 400 may deliver coordinate information corresponding to the crop area acquired by the touch IC to a processor 1202 (e.g., an application processor), and the processor 1202 may deliver, to the sub-DDI 1203, the coordinate information received from the touch IC and the same image data as those transmitted to the main display by the processor 1202.

According to an embodiment, the sub-DDI 1203 of the electronic device 400 may perform a control to crop some of the image data on the basis of the coordinate information received from the processor 1202, and may control the sub-display 1204 to display the cropped image. For example, as illustrated in FIG. 13, the sub-DDI 1203 may generate a crop filter 1302 on the basis of the coordinate information received from the processor 1202, and may generate a crop image by coupling the generated crop filter 1302 and the image data 1301 received from the processor 1202. According to an embodiment, the crop filter 1302 may include a display area corresponding to the coordinate of the crop window 630 selected from the main display 1201 by the user, and a non-display area outside the display area, and the sub-DDI 1203 may perform a control to display only image data corresponding to the coordinates of the display area.

Figure 14:
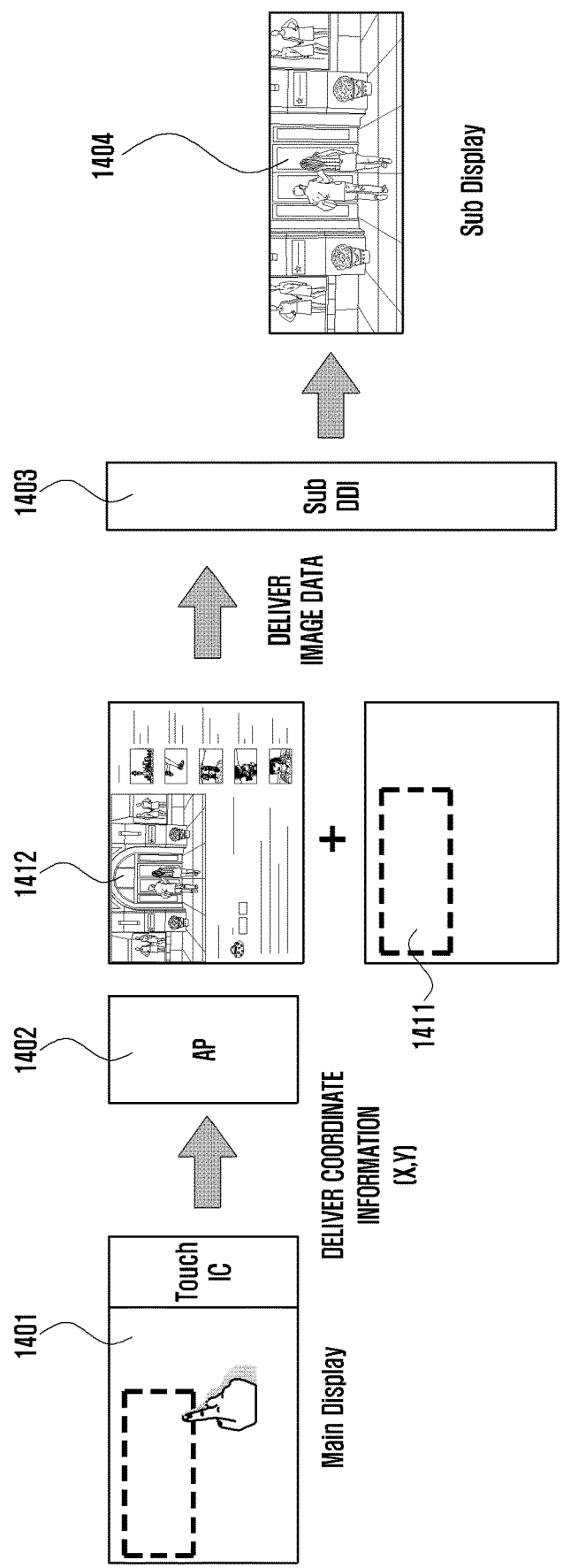
FIG. 14 is a conceptual view illustrating the displaying of a crop image through a second display according to another embodiment.

FIG. 14 is a conceptual view illustrating the displaying of a crop image through a second display according to another embodiment.

Referring to FIG. 14, in an electronic device (e.g., the electronic device 400 of FIG. 4) according to another embodiment of the disclosure, an operation of cropping and displaying some of the contents that are being displayed on a main display 1401 (e.g., the main display 411 of FIG. 4) by a sub-display 1404 (the sub-display 412 of FIG. 4) may include the following sequences.

According to an embodiment, the electronic device 400 may, while the contents are displayed on the main display 1401, receive a user input for selecting at least a partial area of the contents through a touch IC. For example, the electronic device may display a crop window (e.g., the crop window 630 of FIG. 6) on the main display 1401, and may determine a crop area on the basis of a user input for adjusting the location and the size of the crop window 630.

According to an embodiment, the electronic device 400 may deliver coordinate information corresponding to the crop area acquired by the touch IC to a processor 1402 (e.g., an application processor), and the processor 1402 may generate some of the contents corresponding to the crop area as image data by using the coordinate information received from the touch IC and deliver the generated image data to the sub-DDI 1403. For example, the processor 1402 may generate a crop filter 1411 (e.g., the crop filter 1302 of FIG. 13) on the basis of the coordinate information, may generate a crop image by coupling the generated crop filter 1411 and image data 1412 corresponding to the entire area of the contents displayed through the main display 1401 (e.g., the image data 1301 of FIG. 13), and may transmit the generated crop image to the sub-DDI 1403.

According to an embodiment, the sub-DDI 1403 may control the sub-display 1404 to display the image data (e.g., the crop image) received from the processor 1402. For example, the image which the sub-DDI 1403 caused the sub-display 1404 to display may be the crop image that the processor 1402 generated by using the coordinate information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a foldable housing;
   a first display disposed on a first inner surface and a second inner surface of the foldable housing, wherein the first inner surface and the second inner surface face each other in a folded state;
   a second display exposed through at least a portion of an outer surface of the foldable housing;
   a processor operatively connected to the first display and the second display; and
   a memory operatively connected to the processor,
   wherein the memory stores instructions that, when executed, cause the processor to:
   display contents on the first display;
   display a crop window on the first display while the contents are being displayed;
   determine a crop area of the contents based on a first user input for adjusting a location and a size of the crop window;
   generate an image corresponding to a portion of the contents based on information related to the crop area; and
   display the image on the second display;
   wherein the memory stores instructions that, when executed, further cause the processor to:
   in response to a user input, divide the crop window into a plurality of crop windows;
   determine a plurality of crop areas based on a user input for adjusting locations and sizes of the plurality of crop windows; and
   display, on the second display, a plurality of portions of the contents corresponding to the plurality of crop areas.

2. The electronic device of claim 1, wherein the information comprises coordinate information on the crop area.

3. The electronic device of claim 1, wherein the information comprises image data related to the contents displayed on the first display.

4. The electronic device of claim 1, wherein the memory stores instructions that, when executed, further cause the processor to:
   display a screen control menu on the first display in response to reception of a second user input; and
   display the crop window on the first display in response to a third user input for selecting a crop button included in the screen control menu.

5. The electronic device of claim 4, wherein the memory stores instructions that, when executed, further cause the processor to:
   when the crop area is determined, detect whether the electronic device is in the folded state;
   when the electronic device is in the folded state, switch the first display to an off state, and switch the second display to an on state; and
   display, on the second display, the portion of the contents corresponding to the crop area as the image.

6. The electronic device of claim 5, wherein the memory stores instructions that, when executed, further cause the processor to:
   detect whether the electronic device is in an unfolded state while the second display displays the image in the folded state;
   when the electronic device is in the unfolded state, switch the second display to the off state, and switch the first display to the on state; and
   display an entirety of the contents on the first display.

7. The electronic device of claim 4, wherein the memory stores instructions that, when executed, further cause the processor to:
   when a fourth user input is detected while the crop window is displayed on the first display, divide the crop window into a first crop window and a second crop window;
   determine a first crop area and a second crop area based on a fifth user input for adjusting locations and sizes of the first crop window and the second crop window; and
   display, on the second display, a plurality of portions of the contents corresponding to the first crop area and the second crop area.

8. The electronic device of claim 5, wherein the memory stores instructions that, when executed, further cause the processor to:
   detect a sixth user input for adjusting the crop area while the second display displays the portion of the contents corresponding to the crop area; and
   adjust the crop area in response to the sixth user input.

9. The electronic device of claim 8, wherein the memory stores instructions that, when executed, further cause the processor to:
   detect a drag touch on the second display as the sixth user input while the second display displays the portion of the contents corresponding to the crop area;
   change a coordinate of the crop area in response to the drag touch; and
   display another portion of the contents on the second display as the image.

10. The electronic device of claim 8, wherein the memory stores instructions that, when executed, further cause the processor to:
    detect a pinch-in/out touch on the second display as the sixth user input while the second display displays the portion of the contents corresponding to the crop area;
    change a size of the crop area in response to the pinch-in/out touch; and
    display an enlarged or reduced portion of the contents on the second display as the image.

11. A method for displaying information by an electronic device, the electronic device comprising:
    a foldable housing;
    a first display disposed on a first inner surface and a second inner surface of the foldable housing, wherein the first inner surface and the second inner surface face each other in a folded state; and
    a second display exposed through at least a portion of an outer surface of the foldable housing;
    wherein the method comprises:
    displaying contents on the first display;
    displaying a crop window on the first display while the contents are being displayed;
    determining a crop area of the contents based on a first user input for adjusting a location and a size of the crop window;

generating an image corresponding a portion of the contents based on information related to the crop areas; and displaying the image on the second display, wherein the method further comprises:

in response to a user input, dividing the crop window into a plurality of crop windows;

determining a plurality of crop areas based on a user input for adjusting locations and sizes of the plurality of crop windows; and displaying, on the second display, a plurality of portions of the contents corresponding to the plurality of crop areas.

12. The method of claim 11, wherein the information comprises coordinate information on the crop area.

13. The method of claim 11, wherein the information comprises image data related to the contents displayed on the first display.

14. The method of claim 11, further comprising:

displaying a screen control menu on the first display in response to reception of a second user input; and displaying the crop window on the first display in response to a third user input for selecting a crop button included in the screen control menu.

15. The method of claim 14, further comprising:

when the crop area is determined, detecting whether the electronic device is in the folded state;

when the electronic device is in the folded state, switching the first display to an off state, and switching the second display to an on state; and displaying, on the second display, the portion of the contents corresponding to the crop area as the image.

16. The method of claim 15, further comprising:

detecting whether the electronic device is in an unfolded state while the second display displays the image in the folded state;

when the electronic device is in the unfolded state, switching the second display to the off state, and switching the first display to the on state; and displaying, on the first display, an entirety of the contents.

17. The method of claim 14, further comprising:

when a fourth user input is detected while the crop window is displayed on the first display, dividing the crop window into a first crop window and a second crop window;

determining a first crop area and a second crop area based on a fifth user input for adjusting locations and sizes of the first crop window and the second crop window; and displaying, on the second display, a plurality of portions of the contents corresponding to the first crop area and the second crop area.

18. The method of claim 15, further comprising:

detecting a sixth user input for adjusting the crop area while the second display displays the portion of the contents corresponding to the crop area; and adjusting the crop area in response to the sixth user input.

19. The method of claim 18, wherein the adjusting of the crop area comprises:

detecting a drag touch on the second display as the sixth user input while the second display displays the portion of the contents corresponding to the crop area;

changing a coordinate of the crop area in response to the drag touch; and displaying another portion of the contents on the second display as the image.

20. The method of claim 18, wherein the adjusting of the crop area comprises:

detecting a pinch-in/out touch on the second display as the sixth user input while the second display displays the portion of the contents corresponding to the crop area;

changing a size of the crop area in response to the pinch-in/out touch; and displaying an enlarged or reduced portion of the contents on the second display as the image.

* * * * *